US009664868B2

(12) United States Patent
Logan, Jr. et al.

(10) Patent No.: US 9,664,868 B2
(45) Date of Patent: May 30, 2017

(54) ADVANCED MULTI-GIGABIT CONNECTORS, INSERTS, ACTIVE OPTICAL CABLES AND METHODS

(71) Applicant: Glenair, Inc., Glendale, CA (US)

(72) Inventors: Ronald T. Logan, Jr., Pasadena, CA (US); Leo Kha, Diamond Bar, CA (US); Lutz Adrian Mueller, Altadena, CA (US); Troy Chase, Pasadena, CA (US); Narek Hacopian, Burbank, CA (US); Matthew P. Flach, Glendora, CA (US)

(73) Assignee: Glenair, Inc., Glendale, CA (US)

( * ) Notice: Subject to any disclaimer, the term of this patent is extended or adjusted under 35 U.S.C. 154(b) by 36 days.

(21) Appl. No.: 14/742,263

(22) Filed: Jun. 17, 2015

(65) Prior Publication Data

US 2016/0370547 A1 Dec. 22, 2016

(51) Int. Cl.

| | |
|---|---|
| ***G02B 6/36*** | (2006.01) |
| ***G02B 6/42*** | (2006.01) |
| ***H01R 13/6477*** | (2011.01) |
| *H01R 12/59* | (2011.01) |
| *H01R 13/24* | (2006.01) |

(52) U.S. Cl.

CPC ........... *G02B 6/4293* (2013.01); *G02B 6/428* (2013.01); *G02B 6/4246* (2013.01); *G02B 6/4278* (2013.01); *G02B 6/4283* (2013.01); *G02B 6/4284* (2013.01); *H01R 13/6477* (2013.01); *H01R 12/592* (2013.01); *H01R 13/24* (2013.01)

(58) Field of Classification Search

None

See application file for complete search history.

(56) References Cited

U.S. PATENT DOCUMENTS 8,529,276 B2 * 9/2013 Esquivel .............. H01R 12/716 439/492

2007/0237463 A1 * 10/2007 Aronson .............. G02B 6/4292 385/89

2015/0079829 A1 * 3/2015 Brodsgaard ............ H01R 24/84 439/284

OTHER PUBLICATIONS

Samtec, RF 25S Series 50Ω Microwave Cable Assemblies, Feb. 17, 2014, Samtec.

Meritec, Hercules High-Speed Ruggedized Interconnect System, May 16, 2013, Meritec.

(Continued)

*Primary Examiner* — Chad Smith

(74) *Attorney, Agent, or Firm* — Pritzkau Patent Group, LLC

(57) ABSTRACT

A connector insert arrangement, an active optical cable and methods are described. The connector insert is receivable in a connector housing for removable engagement with a complementary connector. Dielectric inserts each support one or more electrical contacts for access by the complementary connector and each electrical contact is selected as one of a contact pad and a spring probe pin for electrical contact with a complementary spring probe pin and complementary contact pad, respectively, in the complementary connector. A ground body supports the dielectric inserts to maintain a characteristic transmission line impedance along each of a plurality of high speed data paths such that each high speed data path serves as an independent transmission line structure that provides a data transfer rate of at least 1 gigabit per second. An active optical cable is described that can be hermaphroditic.

37 Claims, 12 Drawing Sheets

(56) References Cited

OTHER PUBLICATIONS

Meritec, Hercules A 10Gb/s Ruggedized COTS High-Density Interconnect System, Sep. 2, 2014, Meritec.
Samtec, Test Point Array 22 Positions, Mar. 10, 2016, Samtec.
ITT Corporation, Nemesis, 2010, ITT Corporation.
Samtec, High-Performance Test Point System, Apr. 2016, Samtec.

* cited by examiner

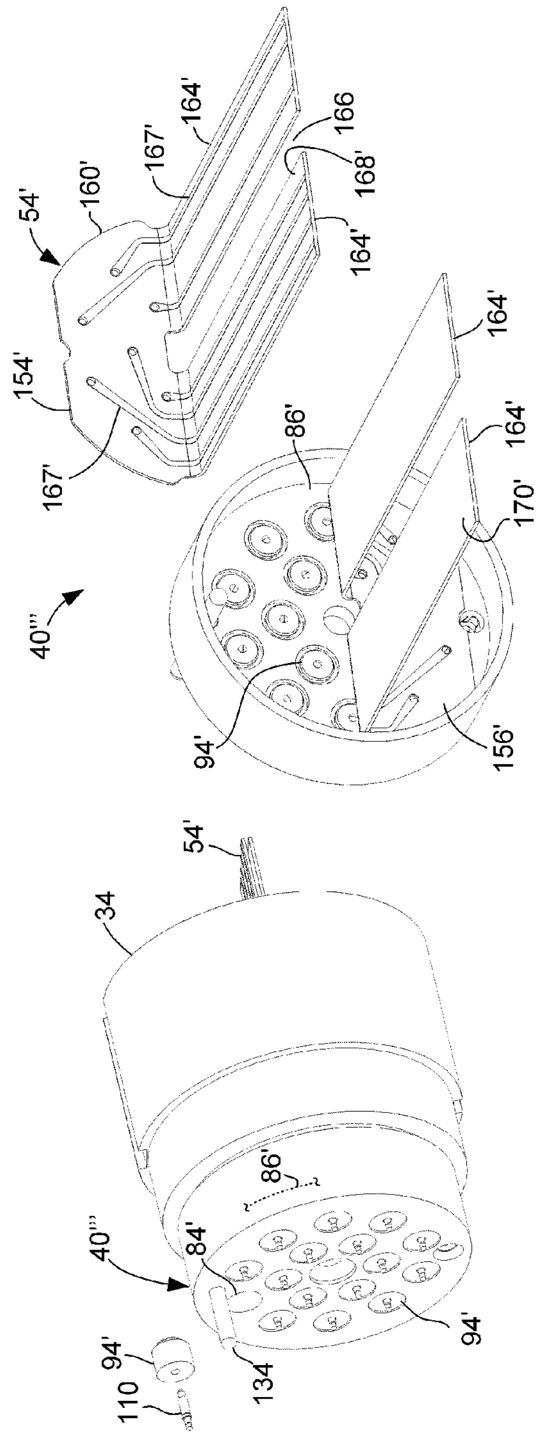
FIGURE 14
FIGURE 13
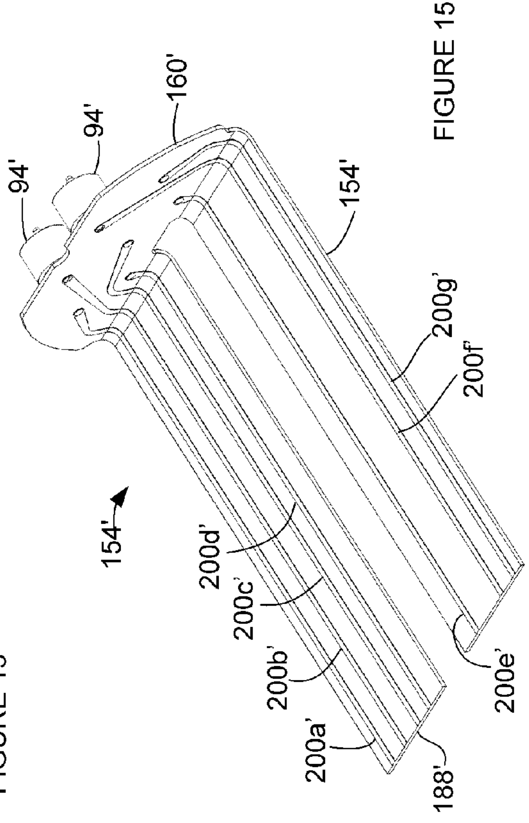
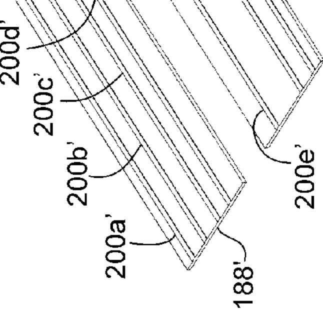
FIGURE 15

ADVANCED MULTI-GIGABIT CONNECTORS, INSERTS, ACTIVE OPTICAL CABLES AND METHODS

BACKGROUND

The present invention is at least generally related to the field of data transfer and, more particularly, to an advanced multi-gigabit connector insert, an active optical cable and associated methods.

The prior art is replete with examples of cables and associated connectors that are asserted to be capable of high speed data transmission via an electrical interconnect. Unfortunately, many of these approaches fail to measure up to the demands of military, heavy industrial and aerospace applications, as well as in situations which require high reliability despite a high number of mating cycles of the electrical interconnect.

Another approach that is seen in the prior art to achieve high data rates is to attempt to utilize a fiber optic cable to replace an electrical cable. Of course, fiber optic cables provide for noise immunity and also avoid the copper losses that are associated with electrical cables. In the context of using a fiber optic cable, however, it is necessary at some point to connect cables to each other, or to convert optical signals between the electrical domain and the optical domain using opto-electronic converters. Unfortunately, the optical interfaces between fiber optic cables, and between a fiber optic cable and an opto-electronic converter, can be extremely sensitive to contamination. For instance, cleaning can be required during each mating cycle. Thus, this approach is likewise limited with respect to military, heavy industrial, aerospace and high mating cycle applications at least for the reason that data transfer can so easily be compromised by introducing contaminants, particularly in the environments of interest.

The present application discloses a different approach which Applicants recognize as being robust in terms of providing high performance data transfer rates accompanied by a remarkable degree of immunity to challenging environmental conditions.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect of the disclosure, a connector insert arrangement and associated method are described. The connector insert arrangement is receivable in a connector housing for removable engagement with a complementary connector. The connector insert arrangement includes a plurality of dielectric inserts each of which supports one or more electrical contacts for access by the complementary connector at a first insert surface of each dielectric insert and each of the dielectric inserts defines an opposing, second insert surface and each electrical contact is selected as one of a contact pad and a spring probe pin for electrical contact with a complementary spring probe pin and complementary contact pad, respectively, in the complementary connector. A ground body includes a ground base that is electrically conductive having a thickness extending between a first ground base surface and a second, opposing ground base surface such that the thickness defines a plurality of apertures each of which receives one of the dielectric inserts for placing each first insert surface in a confronting relationship with the complementary connector and a predetermined characteristic electrical transmission line impedance is exhibited for each electrical contact based on the configuration of each dielectric insert in relation to the ground base. A circuit board arrangement includes a first interface end and an external, opposing interface end with the first interface end electrically interfacing each electrical contact proximate to the second insert surface of each dielectric insert and including at least one ground path in electrical communication with the ground body and extending from the first end of the circuit board to the external interface end for grounding the ground body, and the circuit board forms a plurality of high speed data paths, associated with the electrical contacts, to maintain the characteristic transmission line impedance along each high speed data path and extending to the external interface end of the circuit board arrangement such that each high speed data path serves as an independent transmission line structure that provides a data transfer rate of at least 1 gigabit per second. In one feature, the connector insert arrangement can be supported by each end of an active optical cable.

In another aspect of the present disclosure, a hermaphroditic active optical cable and associated method are described. The hermaphroditic active optical cable includes at least one fiber optic cable having opposing first and second ends. First and second housings each receive a respective one of the first and second ends of the fiber optic cable with each of the first and second housings identically configured such that each is connectable with either a different first housing and a different second housing of a different hermaphroditic active optical cable. At least one opto-electronic converter is received in each one of the first and second housing in optical communication with a respective one of the first and second ends of the fiber optic cable.

BRIEF DESCRIPTIONS OF THE DRAWINGS

Example embodiments are illustrated in referenced figures of the drawings. It is intended that the embodiments and figures disclosed herein are to be illustrative rather than limiting.

Figure 7B:
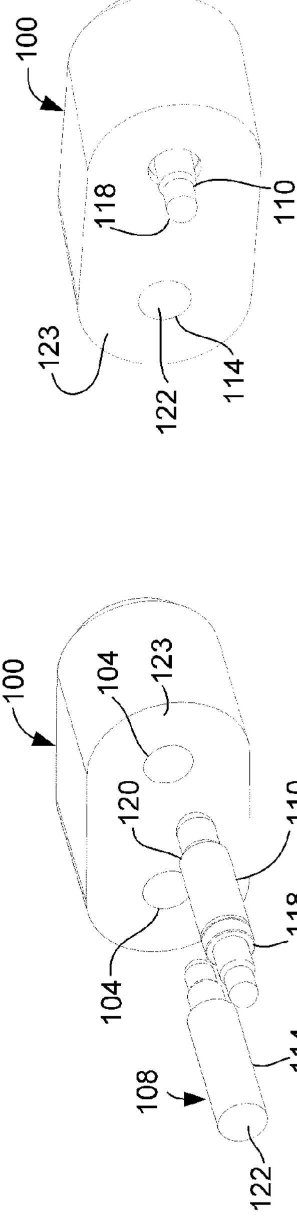
Figure 7A:
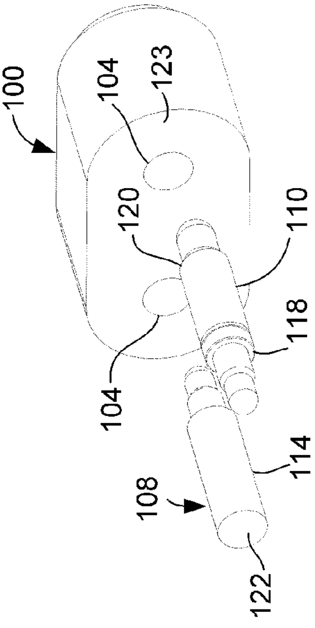

FIG. 7*a* is a diagrammatic view, in perspective showing a dielectric insert in a spaced apart relationship with a contact pair.

FIG. 7*b* is a diagrammatic view, in perspective showing the dielectric insert of FIG. 7*a* having the contact pair installed therein.

Figure 8:
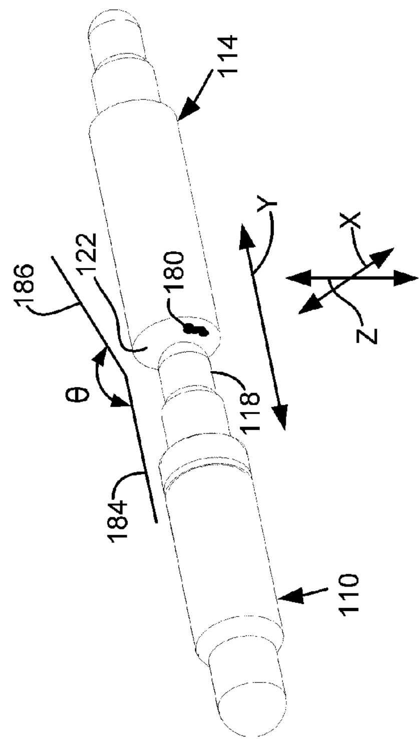

FIG. 8 is a diagrammatic view, in perspective, showing a spring probe pin having a contact pin in resilient contact with an opposing contact surface of a contact pad in order to illustrate various orientation parameters.

Figure 6:
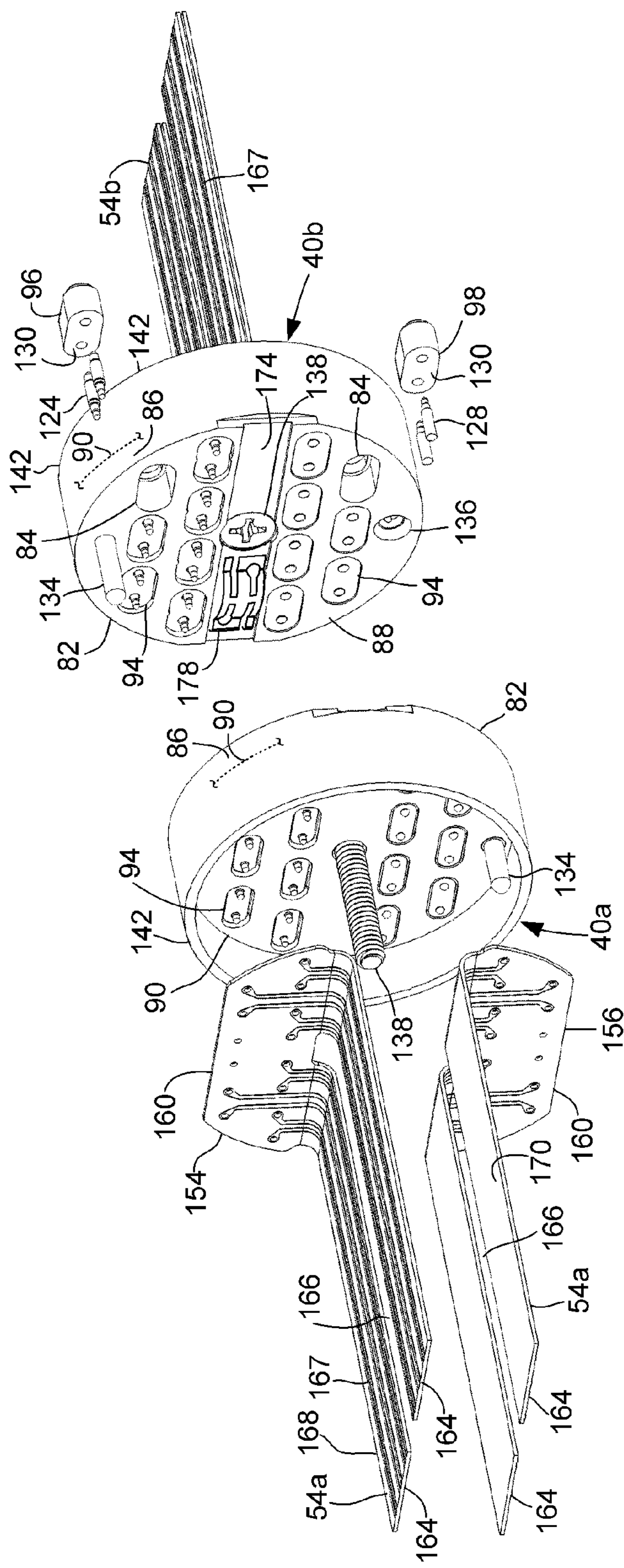
FIG. 6 is a diagrammatic, partially exploded view, in perspective, illustrating a pair of connector inserts in a confronting spaced apart relationship, also shown in FIG. 3, and shown here in a further enlarged view to illustrate details of their structure.
Figure 9:
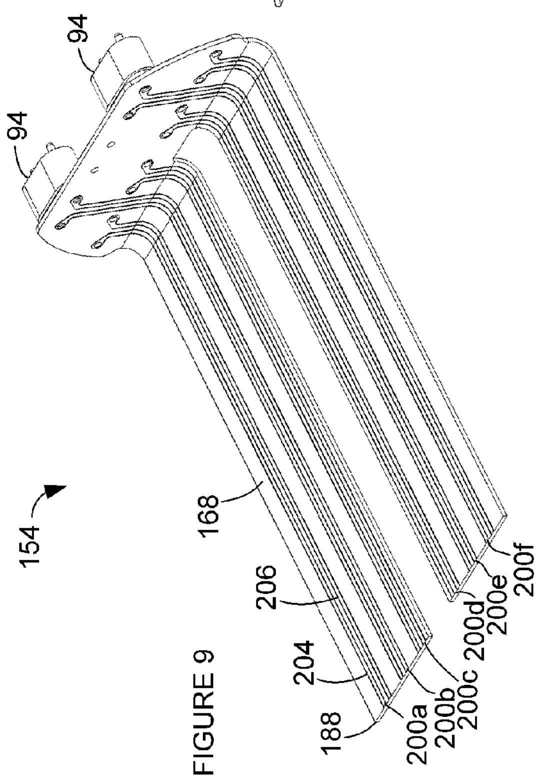

FIG. 9 is a diagrammatic view, in perspective, shown here for purposes of providing additional details with respect to an embodiment of the construction of a flexible printed circuit board that can comprise an upper half of the flexible printed circuit board arrangement that is shown in FIG. 6.

Figure 10:
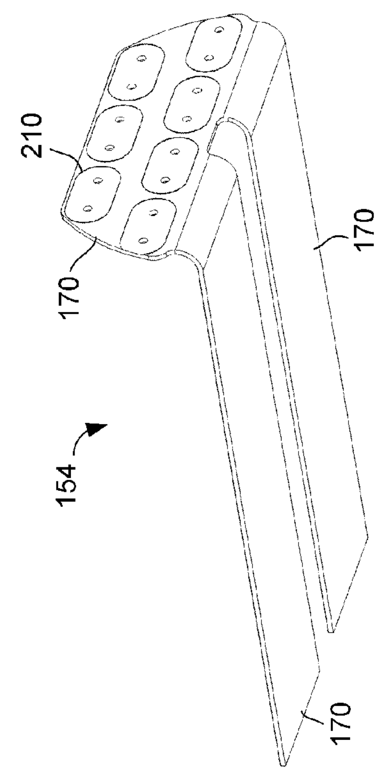

FIG. 10 is a diagrammatic view, in perspective, showing additional details with respect to a ground plane on an opposing surface of the flexible circuit board of FIG. 9.

Figure 11:
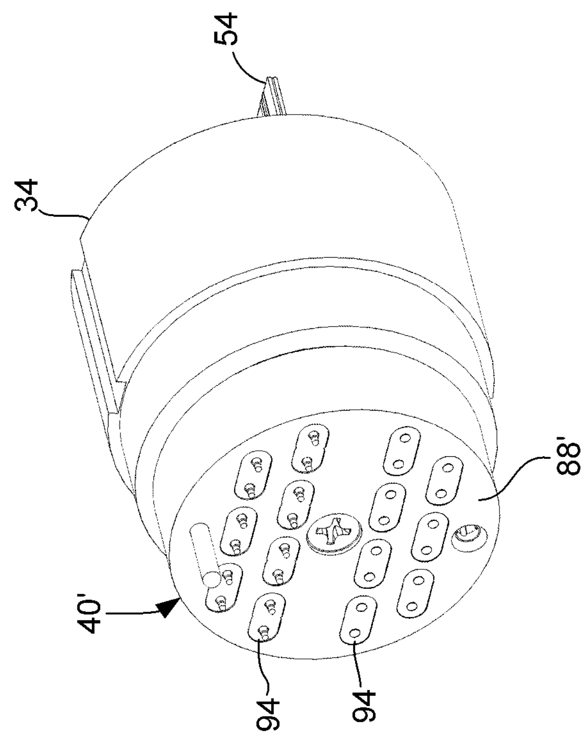

FIG. 11 is a diagrammatic view, in perspective, illustrating another embodiment of a connector insert produced according to the present disclosure.

Figure 12:
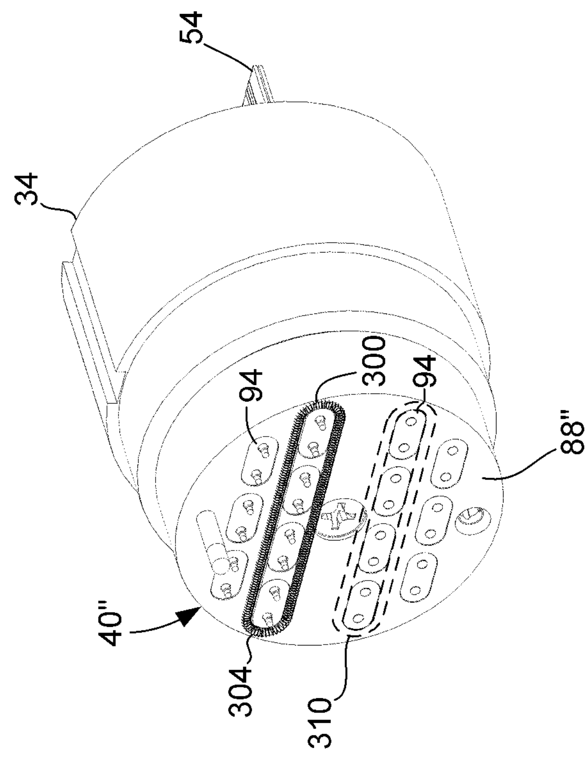

FIG. 12 is a diagrammatic view, in perspective, illustrating still another embodiment of a connector insert produced according to the present disclosure.

FIG. 13 diagrammatically illustrates yet another embodiment of a connector insert produced according to the present disclosure in a perspective view generally showing the appearance of the front of the connector insert.

FIG. 14 is a diagrammatic partially exploded view, in perspective, showing the connector insert of FIG. 13 to generally illustrate the appearance of the rear of the connector insert.

FIG. 15 is a diagrammatic view, in perspective, shown here for purposes of providing additional details with respect to an embodiment of the construction of a flexible printed circuit board that can comprise an upper half of the flexible printed circuit board arrangement that is shown in FIG. 14.

Figure 16:
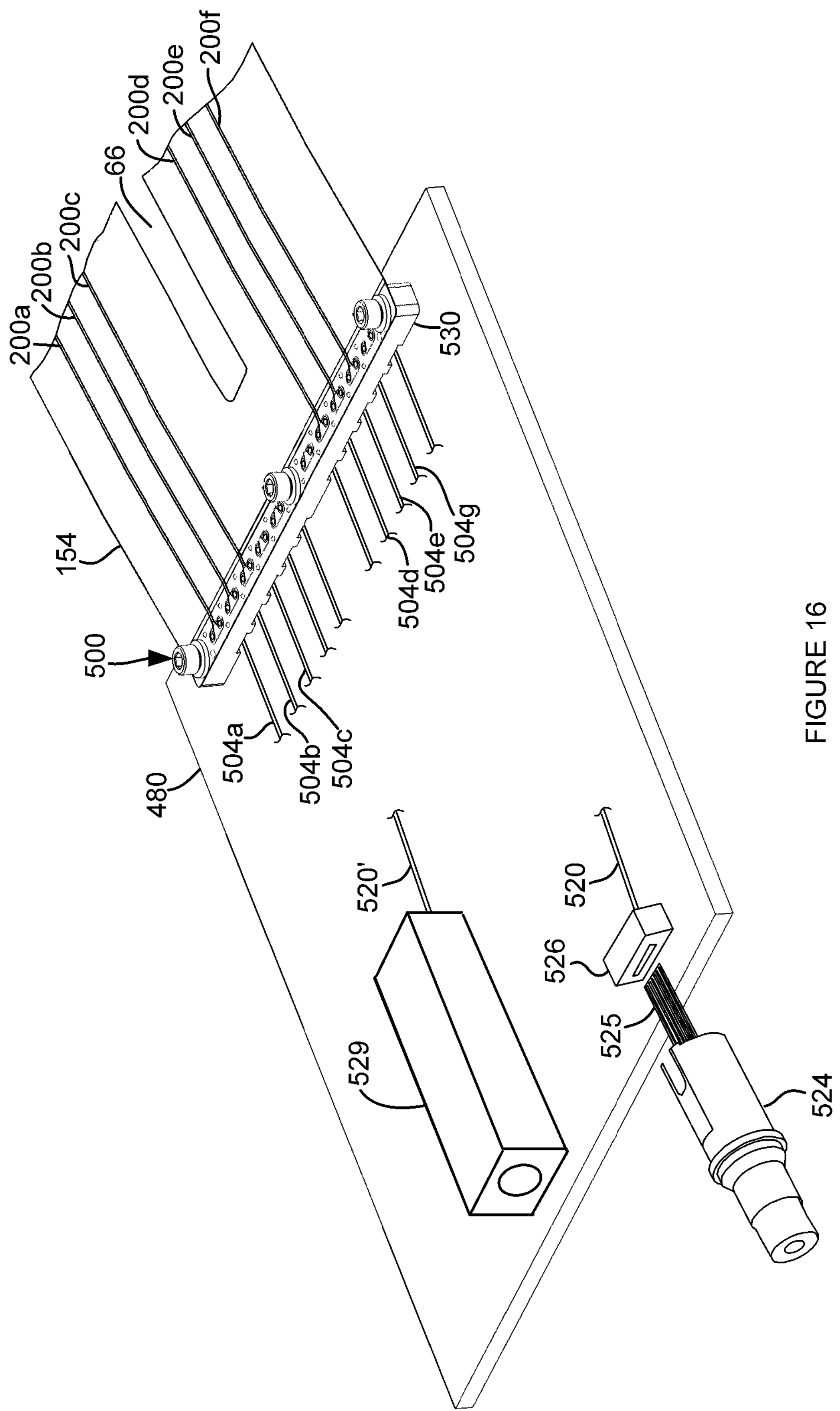

FIG. 16 is a diagrammatic, partially cut-away view, in perspective, showing a distal end of the flexible printed circuit board of FIG. 9 electrically interfaced to a rigid printed circuit board by an embodiment of an edge connector that is produced in accordance with the present disclosure.

Figure 17:
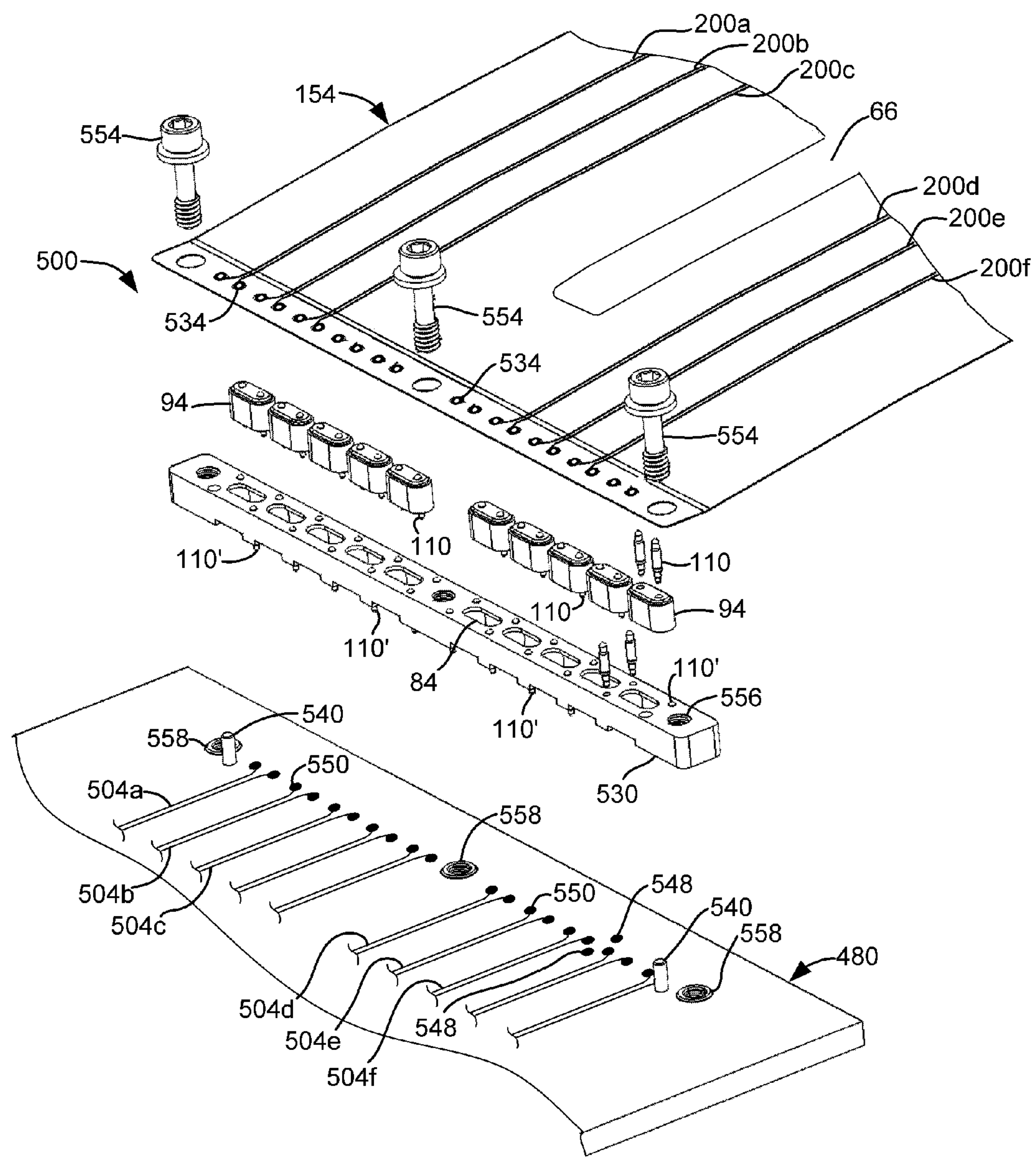

FIG. 17 is a diagrammatic, partially cut-away and exploded view of the edge connector of FIG. 16, shown here to illustrate further details of its structure.

Figure 18:
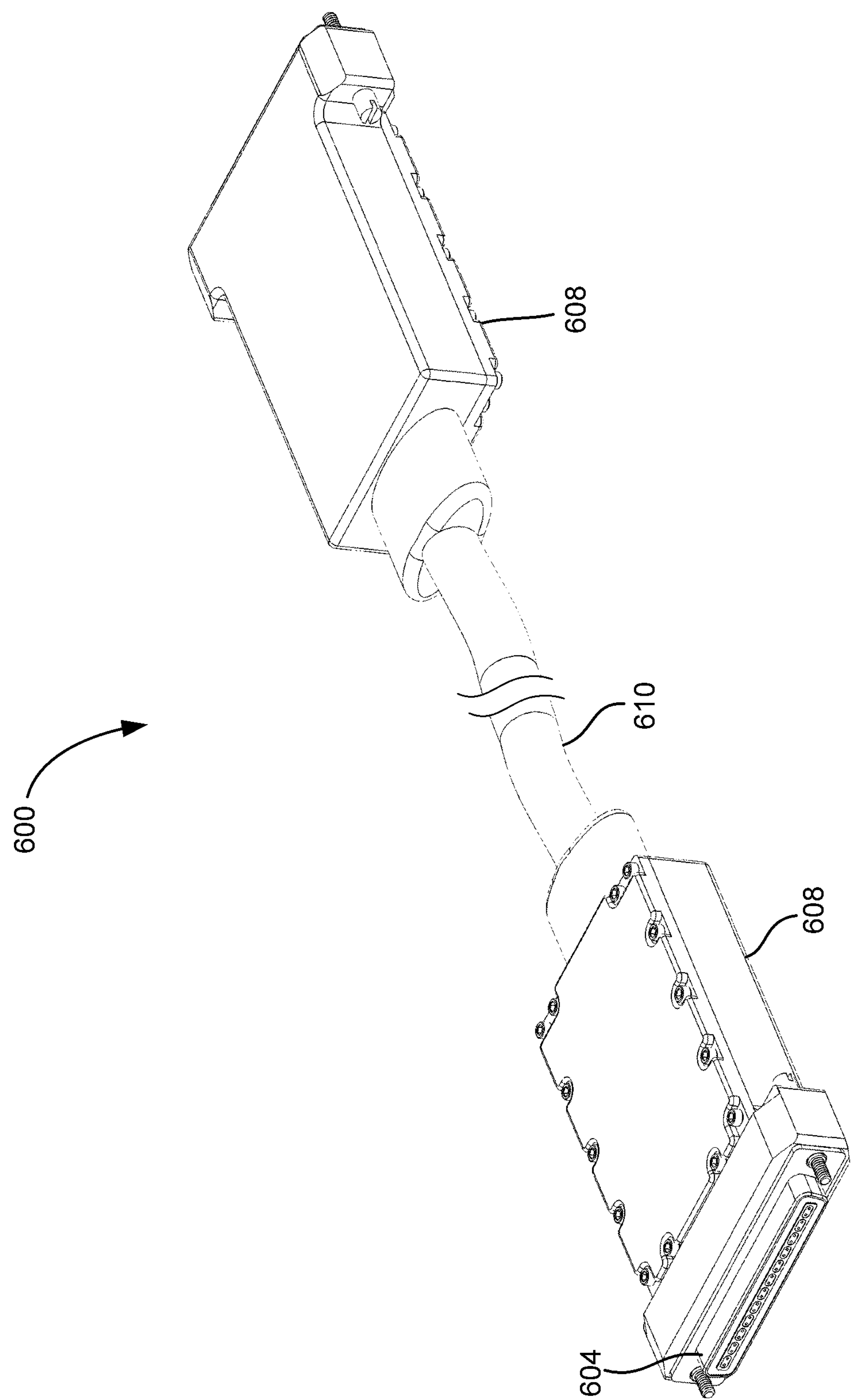

FIG. 18 is a diagrammatic view, in perspective, illustrating an embodiment of an active optical cable, produced in accordance with the present disclosure.

Figure 19:
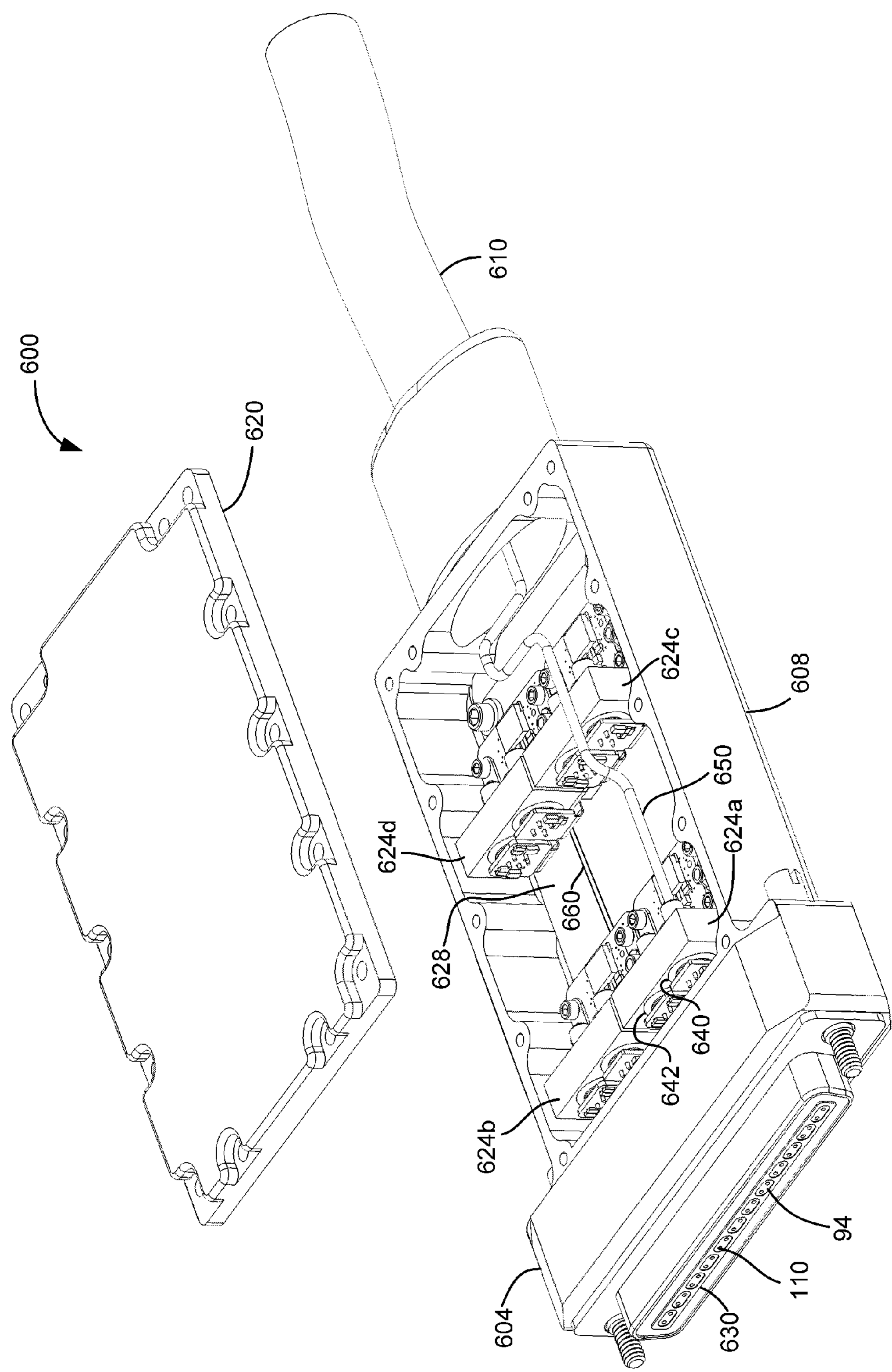

FIG. 19 is a diagrammatic view, in perspective, showing one end of the active optical cable of FIG. 18, further illustrating an embodiment of the internal structure within a back shell.

Figure 20:
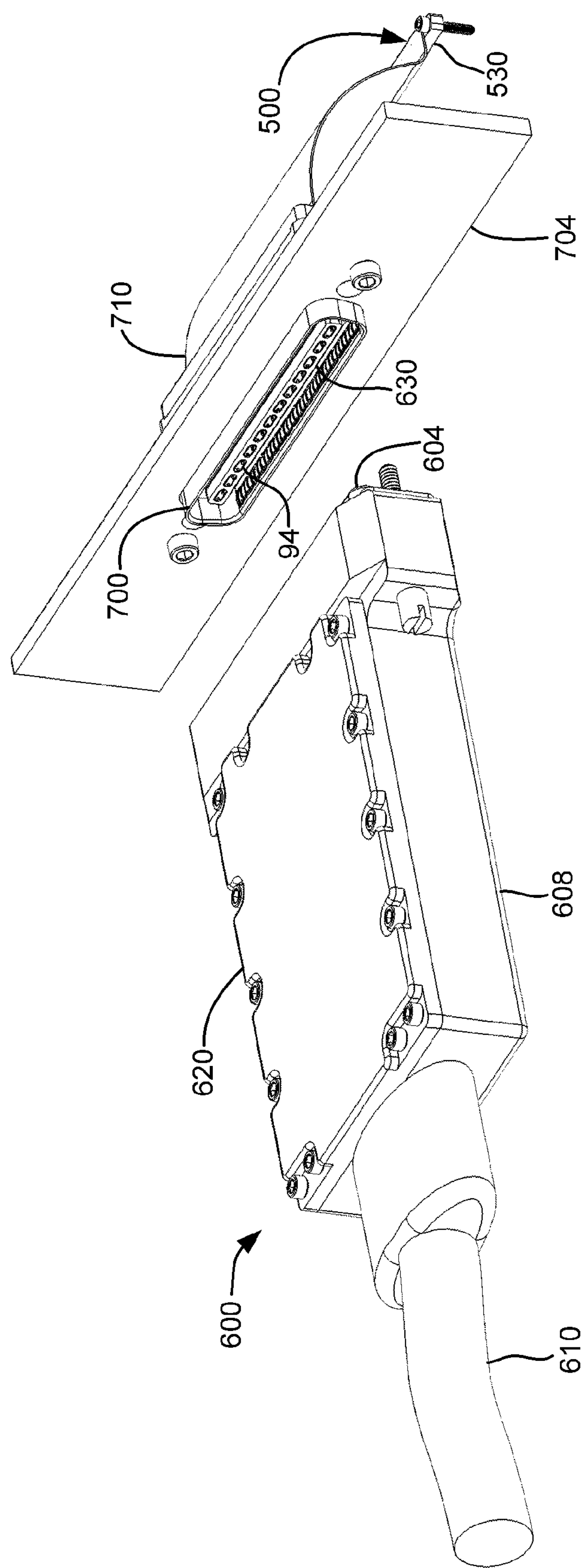

FIG. 20 is a diagrammatic view, in perspective, showing one end of the active optical cable of FIG. 18 in a confronting relationship with a panel-mounted, complementary connector.

Figure 21:
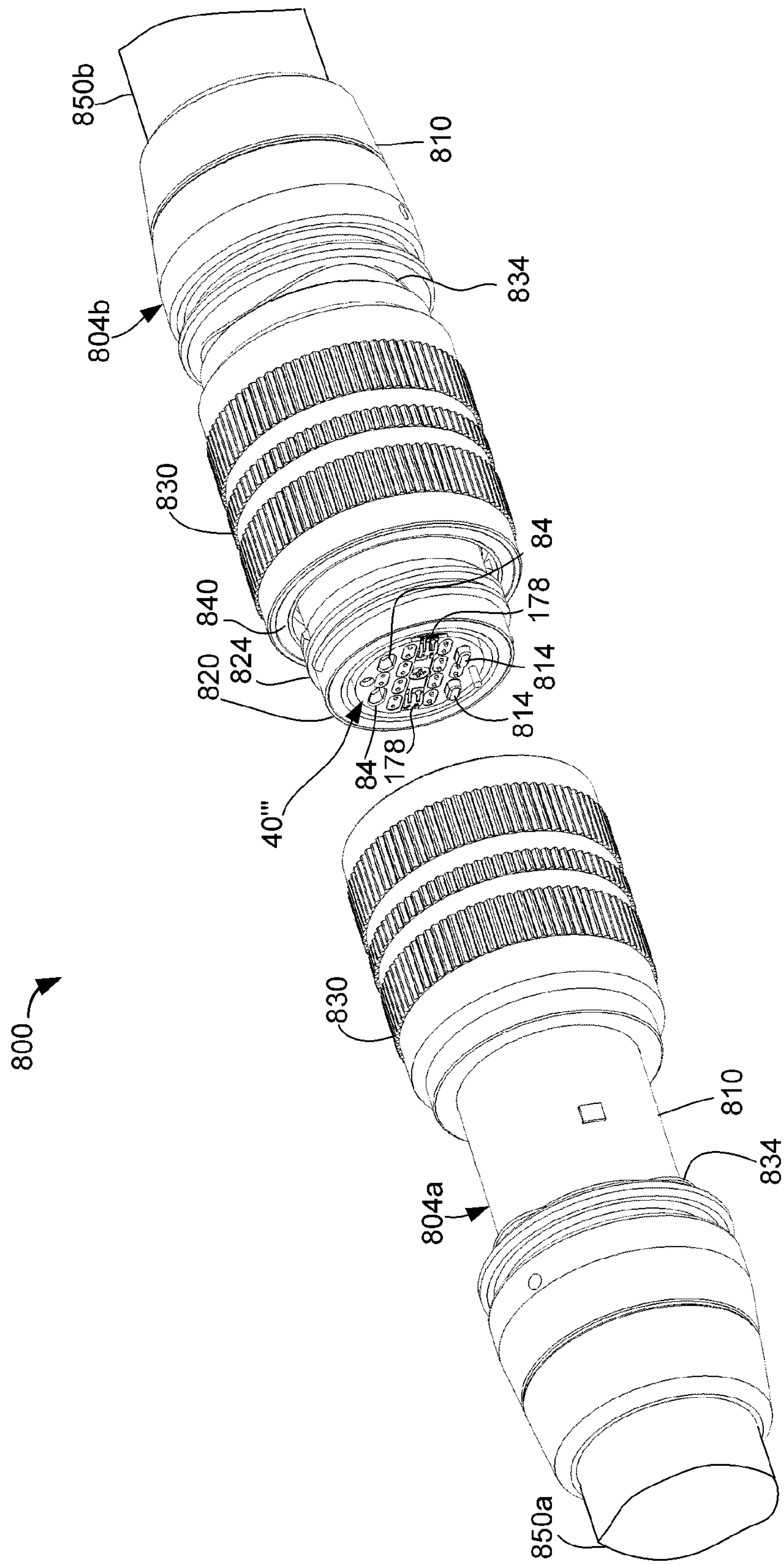

FIG. 21 is a diagrammatic view, in perspective, showing a genderless connector pair in a spaced apart, confronting relationship in the context of providing an active optical cable.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology may be used with respect to these descriptions, however, this terminology has been adopted with the intent of facilitating the reader's understanding and is not intended as being limiting. Further, the figures are not to scale for purposes of illustrative clarity.

Figure 1:
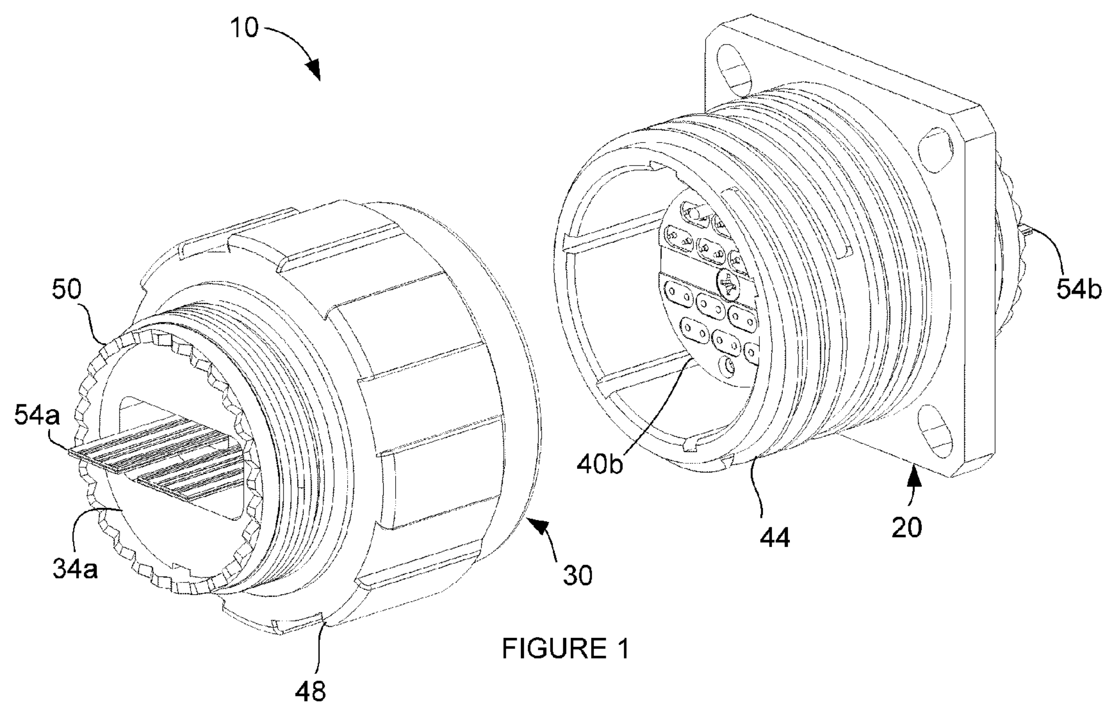
FIGS. 1 and 2 are diagrammatic views, in perspective, illustrating an embodiment of a multi-gigabit connector pair produced in accordance with the present disclosure.
Figure 2:
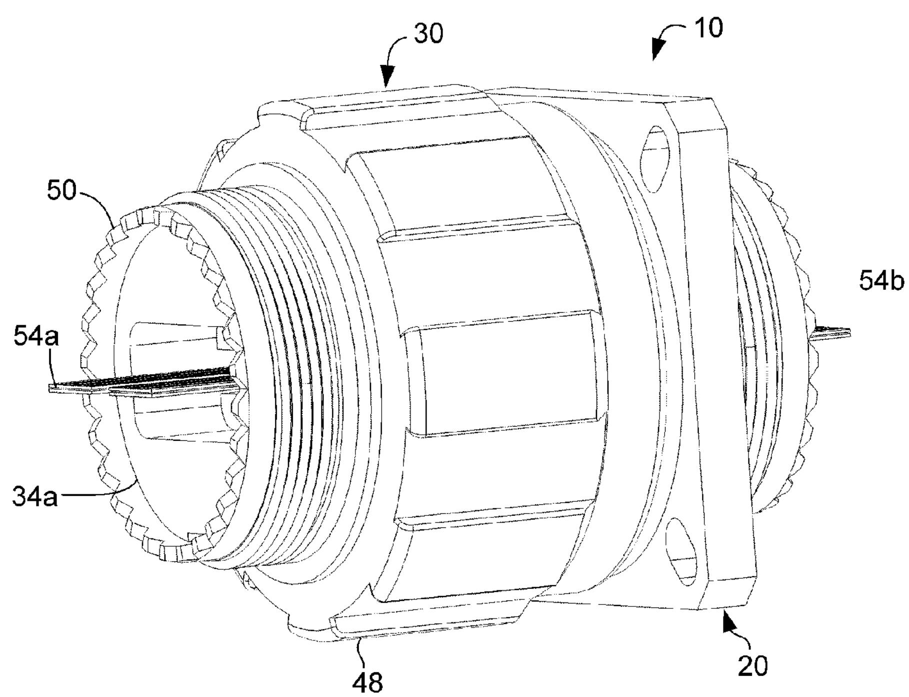

Turning now to the figures wherein like components may be designated by like reference numbers throughout the various figures, attention is immediately directed to FIGS. 1 and 2 which are diagrammatic views, in perspective, illustrating an embodiment of a multi-gigabit connector pair produced in accordance with the present disclosure and generally indicated by the reference number 10. FIG. 1 illustrates the connector pair unmated while FIG. 2 illustrates the connector pair mated. The connector pair includes a connector receptacle 20 and a connector plug 30. It is noted that certain components are utilized by both the connector plug and the connector receptacle. Although these components can be identical in structure, they may be further designated in the various figures by an appended "a" when associated with the connector plug and by an appended "b" when associated with the connector receptacle, solely for purposes of illustrative clarity. Reference to a particular component without an appended "a" or "b" should be understood to apply to all instantiations of that component in a general sense. In the present embodiment, each of a connector receptacle 20 and a connector plug 30 supports a connector insert adapter 34*a* (connector insert adapter 34*b* is not visible) and a connector insert 40*b* (connector insert 40*a* is not visible). It is noted that the connector inserts of the present embodiment may be referred to interchangeably herein as pucks, ground pucks and ground bodies. Connector receptacle 20 carries a thread 44 for engagement by a rotatable lock ring 48 for mating the connector plug to the connector receptacle. Lock ring 48 is supported on a plug body 50 of connector plug 30. While the connector receptacle is shown as a panel mount embodiment, this is not required. The connector receptacle can be configured in any suitable manner including, for example, a cable-end receptacle. In the present embodiment, a flexible circuit board assembly 54*a* or 54*b* extends from a respective connector insert 40. As will be seen, each flexible circuit board assembly, in cooperation with its connector insert, forms a plurality of multi-gigabit data paths through the connector pair, with each data path exhibiting a characteristic transmission-line impedance along its length. In the present example, the connector plug and receptacle are produced according to MIL-38999, although any suitable form of connector plug and shell can be utilized, as will be further discussed. It should be appreciated that the approach brought to light herein is universal and not dependent on any particular connector type. That is, embodiments can be implemented in panel-mount blind-mating connectors such as ARINC 600 or VPX backplane connectors as are commonly used in aerospace applications, rectangular "D-subminiature" connectors, or other connector types.

Figure 3:
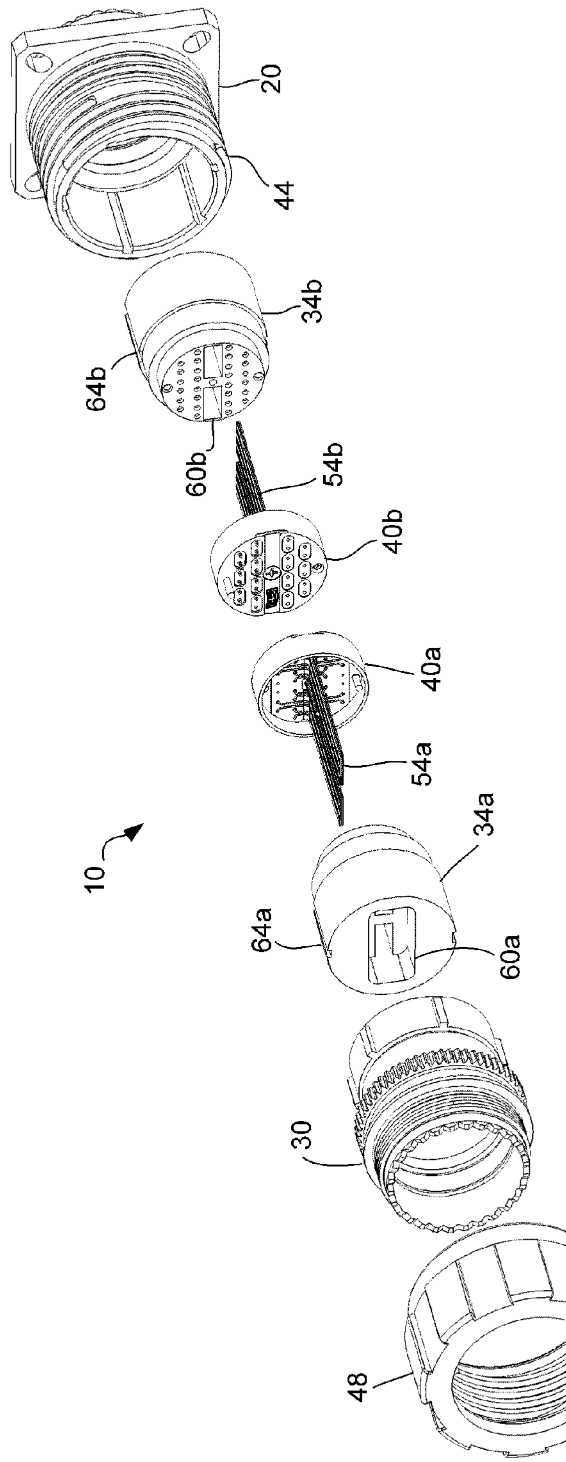
FIG. 3 is an exploded, diagrammatic view of the embodiment of the connector pair, previously shown in FIGS. 1 and 2, and shown here for purposes of illustrating additional details.

Attention is now directed to FIG. 3 which is an exploded, diagrammatic view of the embodiment of connector pair 10, previously shown in FIGS. 1 and 2, and shown here for purposes of illustrating additional details. In the instance of connector plug 30, connector insert adapter 34*a* along with connector insert 40*a* and flexible circuit board assembly 54*a* can be received in a through hole of plug body 30 such that flexible circuit board assembly 54*a* extends through an aperture 60*a* that is defined by connector insert adapter 34*a* and outward from connector plug 30 for external electrical connection thereto. Similarly, for connector receptacle 20, connector insert adapter 34*b* along with connector insert 40*b* and flexible circuit board assembly 54*b* can be received in a through hole of receptacle 20 such that flexible circuit board assembly 54*b* extends through aperture 60*b* of connector insert adapter 34*b* and outward from receptacle 20 for external electrical connection thereto. It is noted that connector inserts 40*a* and 40*b* are configured as hermaphroditic, although this is not a requirement.

Figure 5:
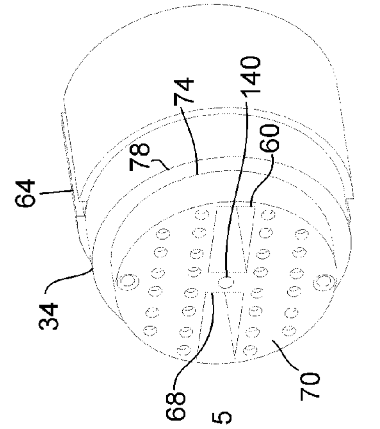
FIG. 5 is a diagrammatic view, in perspective, taken from the front of the connector insert adapter of FIG. 4, shown here to illustrate further details with respect to the present embodiment of its structure.
Figure 4:
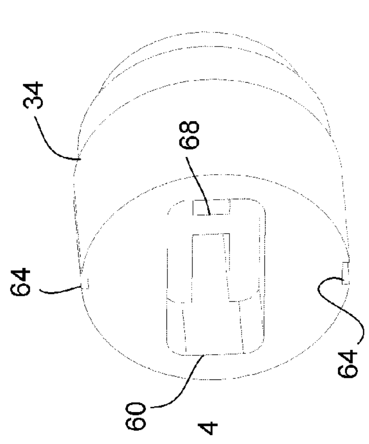
FIG. 4 is a diagrammatic view, in perspective, taken from the rear of an embodiment of a connector insert adapter according to the present disclosure, shown here to illustrate further details with respect to the present embodiment of its structure.

FIG. 4 is a diagrammatic view, in perspective, taken from the rear of connector insert adapter 34 while FIG. 5 is a diagrammatic view, in perspective, taken from the front of connector insert adapter 34, shown here to illustrate further details with respect to the present embodiment of its structure. One or more indexing features such as, for example, a groove 64 can be formed to engage complementary features of receptacle 20 and plug body 30. A divider 68 can be present along a portion of the length of aperture 60 extending to a front surface 70. The latter is delimited by an inset peripheral sidewall 74 that can be cylindrical in configuration, although this is not required, for engaging a complementary feature, yet to be described, of connector insert 40. An annular shoulder 78 extends around a periphery of the connector insert adapter. Insert adapter 34, for example, can be permanently installed into connector plug 30 and receptacle 20 using epoxy. Cavity 60, for example, can be filled with potting material to provide for sealing of the assembly.

Attention is now directed to FIG. 6, which is a diagrammatic, partially exploded view, in perspective, illustrating the present embodiment of connector inserts 40*a* and 40*b* in a confronting, spaced apart relationship. Each connector insert includes a ground body or puck 82 that defines a plurality of connector insert apertures 84 (several of which are specifically designated) within a ground layer or base 86 such that a front surface 88 comprises one major surface of the ground layer and a rear surface 90 comprises the other major surface. Ground body 82 can be formed from any suitable electrically conductive material such as, for example, aluminum, and may include plating such as, for example, gold to improve conductivity and to resist corrosion. Each connector insert aperture is configured to receive a dielectric insert 94 (several of which are individually designated). Two of these dielectric inserts are shown in a spaced apart relationship from connector insert 40*b* and are designated by the reference numbers 96 and 98. FIGS. 7*a* and 7*b* illustrate still another one of the dielectric inserts, shown in a diagrammatic, perspective view and designated by the reference number 100. Each dielectric insert of this embodiment defines a pair of through holes 104 (FIG. 7*a*) for receiving a pair of electrical contacts 108. FIG. 7*a* shows the contact pair spaced apart from the dielectric insert while FIG. 7*b* shows the contact pair installed in the dielectric insert. In the instance of dielectric insert 100, the contact pair includes a spring probe pin 110 and a contact pad 114. The spring probe pin includes a contact pin 118 that is resiliently received within a body 120 such that the contact pin moves axially into body 120 responsive to contact pin 118 being resiliently received or biased against an opposing contact pad such as an outward end or pad 122 of an opposing one of contact pads 114. It is noted that spring probe pins are well-known and often referred to as pogo pins. The contacts can be installed (FIG. 7*b*) into a respective one of the dielectric inserts in any suitable manner such as, for example, by using a pressed fit such that contact pad 122 is aligned with an outward surface 123 of the dielectric insert into which it is installed and such that contact pin 118 can be externally biased so as to be fully received within the dielectric insert responsive to resiliently engage an opposing contact pad. While FIGS. 7*a* and 7*b* illustrate the use of contact pair 108 having one spring probe pin 110 and one contact pad 114, this is not a requirement. In other embodiments, which are illustrated by FIG. 6, a contact pair 124 can include two spring probe pins while a contact pair 128 can include two contact pads. Contacts 110 and 114 can be formed from any suitable electrically conductive material with sufficient hardness to withstand repeated engagement, such as, for example, gold-plated and hardened beryllium copper. The spring probe pin can utilize, for example, a coil spring to resiliently bias contact pin 118. In the present embodiment, each dielectric insert includes a length that is terminated by a pair of opposing, parallel end surfaces and a pair of opposing semi-cylindrical side surfaces. It should be appreciated that any suitable shape can be used and that there is no requirement to use the same shape for all of the dielectric inserts received in each ground base 86. Dielectric inserts 94 can be formed from any suitable dielectric material such as, for example, Teflon, Ultem, EPDM or PEEK. In this regard, the particular dielectric material that is selected cooperates with the remainder of the structure of the dielectric insert and ground base 86 to provide a characteristic transmission-line impedance that is matched to another characteristic transmission-line impedance that is provided by flexible printed circuit board 54, as yet to be described.

In the embodiment of FIG. 6, dielectric inserts 94 can be installed having an outward facing surface 130 at least approximately flush with surface 88 of the connector insert or slightly recessed with respect to surface 88. For example, surface 130 can be recessed by 5 mils or within a range from 1 to 20 mils.

Referring to FIG. 7*b*, it should be appreciated that the contact pairs of connector insert 40*a* are complementary to the contact pairs of connector insert 40*b*. Thus, when the two connector inserts are mated as part of an overall connector pair, each contact spring pin resiliently biases against an opposing contact pad. As discussed above, this allows for a hermaphroditic configuration. Proper mating between the two sides of the connector pair can be ensured, for example, by utilizing an alignment pin 134 which is receivable within a hole 136 that is defined by an opposing connector insert. A socket can be received within hole 136 to ensure electrical continuity between mated connector pairs. Each connector insert 40 can be installed onto a connector insert adapter 34 (FIG. 5), for example, using a threaded fastener 138 that engages an opening 140 (FIG. 5) of the connector insert adapter. Each connector insert defines a peripheral skirt 142 that extends from ground base 86 such that one of the connector insert adapters can be installed thereon by inserting front surface 70 into the connector insert adapter so that peripheral skirt 142 surrounds peripheral sidewall 74 and biases against annular shoulder 78. Prior to such installation, however, flexible circuit assembly 54 can be installed onto connector insert 40, as yet to be described.

Attention is now directed to details with respect to flexible circuit board assembly 54. In FIG. 6, flexible circuit board assembly 54*a* is shown in an exploded view, spaced apart from connector insert 40*a*, while flexible circuit board assembly 54*b* is shown assembled and electrically interfaced to connector insert 40*b*. In the present embodiment, the flexible circuit board assembly includes first and second flexible circuit boards 154 and 156, respectively, which can be identical to one another, although this is not required. Each of the first and second flexible circuit boards includes a connector contact portion 160 from which a pair of flex extensions 164 extend so as to be received within aperture 60 of connector insert adapter 34 (FIGS. 4 and 5). A slot 166 provides for installation around divider 68. In the present embodiment, each flexible circuit board is doubled-layered and includes electrically conductive traces 167 on a first side 168 and a ground plane 170 on a second, opposing side, as will be described in further detail. Other embodiments can utilize single-layered or multi-layered configurations. Flexible extensions 164 can be provided as layers within a multilayer configuration diverging or separating into each connector contact portion 160, as opposed to using separate flexible circuit boards 154 and 156. Each connector portion 160 can at least generally form a 90° angle with its associated pair of flex extensions 164. The contact pairs of each connector insert adapter 34 are generally arranged in an upper group and a lower group, in the view of FIG. 6. The upper and lower groups are spaced apart by an inset region 174 that supports a ground spring 178. In this way, the ground spring of each connector insert, in a mated connector pair, electrically and resiliently contacts the inset region of an opposing connector insert such that ground potential can be provided on one connector insert 40 and coupled to an opposing connector insert to carry the ground potential through the mated connector pair. In this regard, the subject ground potential can be different than the potential at which connector plug 30 (FIGS. 1-3 and connector receptacle 20 are held when connector insert adapters 34 are formed from an electrically insulative material, although this is not required. Ground spring 178 can be formed from any suitable material such as, for example beryllium copper and can be attached to inset region, for example, by a screw fastener, or by spring force of the resilient material engaging with cooperating surface features in ground base 86. The particular shape of the ground spring that has been illustrated is not intended as being limiting and other suitable shapes can be used so long as the ground spring extends sufficiently beyond surface 88 to contact inset region 174 of opposing connector insert adapter/ground body 40*a*.

Attention is now directed to FIG. 8 which is a diagrammatic view, in perspective, showing spring probe pin 110 having contact pin 118 in resilient contact with an opposing contact surface 122 of a contact pad 114, for example, with the spring probe pin and the contact pad supported by connector plug 30 and connector receptacle 20, respectively. Applicants recognize that this resilient contact or bias is highly resistant to contamination 180 that might be present. The resilient contact provides a wiping configuration that can remove dirt and contamination from a point of contact between contact pin 118 and contact surface 122. Such wiping functionality is present during initial engagement between the contact pin and contact surface and subsequently with respect to any movement of connector plug 30 relative to connector receptacle 20 that can be caused by mating tolerances or external forces that are applied to one and/or the other of the receptacle plug and the receptacle connector. In this regard, resilient electrical contact can be maintained when spring probe pin 110 moves relative to contact pad 122 in any direction that is defined with a plane that is defined by orthogonal X and Z axes. Resilient electrical contact is also maintained responsive to movement of spring probe pin 110 relative to contact pad 122 axially along a Y axis (aligned with the elongation axes of the spring probe pin and contact pad) as well as when an angle θ is formed between an elongation axis 184 of spring probe pin 110 and an axis 186 of contact pad 114. It should be appreciated that angle θ can be formed in any plane defined by elongation axis 184 of the spring probe pin and elongation axis 186 of the contact pad. Accordingly, relative movement can be simultaneously accommodated in 4 degrees of freedom while maintaining resilient electrical contact even in the presence of substantial contamination. It should be appreciated that elongation axis 184 can correspond to a central axis of first ground body 40*a* in FIG. 3 while elongation axis 186 can correspond to a central axis of second ground body 40*b*. In this way, a predetermined mating tolerance provides for relative movement of the first ground body (i) toward and away from the second ground body, (ii) transverse to the second ground body, and (iii) rotated with respect to the second ground body such that the first axis is angularly offset with respect to the second axis by angle θ. In addition to maintaining electrical contact with high tolerance to relative movement, Applicants expect that empirical testing will demonstrate that resilient electrical contact is maintained in the presence of high levels of shock and vibration such as, for example, 30 Grms as well as during thermal cycling from at least −40° C. to at least 85° C. Similarly, moisture ingress, high humidity and contamination, for example, in the form of dirt, sand, mud, salt spray, snow and ice will be tolerated at a level that exceeds the requirements of typical military-grade connectors. Accordingly, Applicants recognize that the approach that has been taken by the present disclosure in relation to the use of spring probe pins and contact pads is remarkably well-suited to ruggedized military, industrial or aerospace electrical interconnects. Still further, Applicants recognize that the use of spring probe pins and contact pads provides for a non-fragile assembly capable of at least several thousand mating cycles without significant degradation of electrical continuity through a mated connector pair. In fact, the number of mating cycles may be limited by the mechanical robustness of the connector shell system that is in use, as opposed to connector inserts according to the present disclosure.

Referring to FIG. 6, it should be appreciated that front surface 88 does not present an electrical interface having uneven surfaces and variegated features that serve to retain contaminants. It is noted that many prior art connector implementations include such uneven surfaces and variegated features which readily retain contaminants and can be very difficult to clean. In this regard, front surface 88 with the use of spring probe pins and contact pads provides for ease of cleaning, even in the field, using simple wiping with little risk of damaging the electrical contact components. In this regard, a slight recess of the dielectric insert with respect to front surface 88, as discussed above, does not significantly affect such cleaning.

FIG. 9 is a diagrammatic view, in perspective, shown here for purposes of providing additional details with respect to an embodiment of the construction of flexible printed circuit board 154 of FIG. 6, representing the upper half of the flexible printed circuit board arrangement that is shown in FIG. 6. It should be appreciated that the discussions with respect to FIG. 9 are equally applicable to circuit board assemblies using multilayer rigid and/or flexible printed circuit boards and combinations of rigid and flexible printed circuit boards. In the present embodiment, flexible circuit board 154 is shown interfaced to several dielectric inserts 94. A distal end 188 can be externally electrically interfaced in any suitable manner, including soldering, or via an electrical connector to attach to another circuit board. The contact pair of each dielectric insert is electrically interfaced to a high speed data path that is defined by one of the flexible circuit boards. In the present embodiment, six high speed data paths are shown, indicated by the reference numbers 200*a-f*. Each high speed data path includes a differential pair of electrical conductors designated as 204 and 206 for path 200*a* and which may be referred to collectively as differential pairs 200. Flexible circuit board 154 is configured to provide a transmission-line path such that each differential pair exhibits a characteristic transmission-line impedance along the transmission-line path that is impedance matched to each dielectric insert and electrical contact pair. The differential pair transmission-line traces on the flexible circuit board can be electrically coupled to an associated differential contact pair, for example, using standard soldering techniques.

Referring to FIG. 10 in conjunction with FIG. 9, the former is a diagrammatic view in perspective showing additional details with respect to ground plane 170 on the opposing surface of flexible circuit board 154. An island or relief 210 can be formed in the ground plane around a footprint that is associated with each dielectric insert. Ground plane 170 can be electrically interfaced to its associated connector insert 40 (FIG. 6) in any suitable manner such as, for example, by soldering. In other embodiments, ground features may also be present on first side 168 (FIGS. 6 and 9) of the flexible circuit board. Such features can include, for example, ground traces. In the present example, differential pairs 200 are configured to exhibit a differential impedance of 100 ohms as the characteristic transmission-line impedance, although any suitable value may be utilized. The differential impedance of these differential pairs can be established, for example, based on signal trace width, separation between signal traces and ground traces or planes, and the dielectric constant of the flexible circuit board material in a manner that is familiar to those of ordinary skill in the art. It is noted that a small discontinuity in the impedance is exhibited over the limited distance that the traces of each differential pair diverge to extend to each of the electrical connection points of the electrical contacts. This limited distance, however, is small compared to a wavelength at the highest frequency of interest, to present a small perturbation in the impedance which is negligible. The present embodiment utilizes a differential microstrip configuration, where the ground plane is underneath the signal traces, although this is not required. The differential microstrip configuration has the effect of containing the electric fields mostly in-between the traces and inside of the flexible circuit board to ground, so that they interact as little as possible with the adjacent transmission line pairs. Flexible circuit board 154 and associated dielectric inserts/contacts provide a high-speed electrical connection interface for typical military, aerospace and industrial environments capable of transmitting a large number of high-speed data signals over 100-ohm differential pair traces through a ruggedized electrical connector shell system. Each flexible circuit board 154 provides for six parallel high speed data paths/interconnects capable of speeds exceeding 10 gigabits per second for each differential 100-ohm data pair. Accordingly, an overall throughput of at least 120 gigabits per second can be provided by an overall connector pair (FIGS. 1 and 2) wherein the connector plug and connector receptacle each utilize two instantiations of flexible circuit board 154. In this regard, suitable embodiments of flexible circuit board 154 can use less than or more than six differential pairs with associated numbers of dielectric inserts/contacts.

Attention is once again directed to FIG. 6. Having described the implementation of a characteristic transmission line impedance along the length of each data path immediately above, the implementation of connector insert 40 and dielectric inserts 94 will now be described with respect to maintaining that characteristic transmission line impedance on the differential contact pairs through the dielectric inserts to provide an impedance match with the high speed data paths of the flexible circuit board or other circuit board assembly. The differential impedance of these differential pairs can be established as the characteristic transmission-line impedance, for example, based on the contact diameter, separation between the contacts and between the contacts and the surrounding ground surface, and the dielectric constant of the insert material in a manner that is familiar to those of ordinary skill in the art. In practice, it is generally helpful to use computer modeling of the electromagnetic field distribution in the dielectric insert region to aid in the design of the dimensions to achieve the target impedance, and to take into account the variegated structure of the diameter, for example, of a spring probe pin along its length, among other details.

Attention is now directed to FIG. 11 which illustrates an embodiment of a connector insert, shown in a diagrammatic, perspective view, and generally indicated by the reference number 40'. It should be appreciated that connector insert 40' can be hermaphroditically configured such that an opposing connector insert in a connector pair is identical. The present description will be limited to aspects of connector insert 40' which differ from previously described connector insert 40 for purposes of brevity. In this embodiment, connector insert 40' includes a face or surface 88' that is smooth or planar, at least to an approximation. At the same time, dielectric inserts 94 are recessed with respect to surface 88' by a suitable amount such as, for example, 5 mils or within a range from 1 to 10 mils. In this way, grounding of connector insert 40' to an opposing or confronting connector insert, as part of a connector pair, is accomplished by face 88' directly contacting the corresponding, confronting face of an opposing connector insert. By recessing the dielectric inserts, the latter do not contact dielectric inserts of opposing dielectric inserts in a way which would prevent face 88' from electrically contacting the corresponding face of an opposing connector insert without any significant adverse effect on the ability to clean surface 88'. Even if an angular offset is present between opposing connector inserts 88', there will be at least some area of electrical contact therebetween such that a ground potential can be carried from one connector insert to the other.

FIG. 12 illustrates still another embodiment of a connector insert, shown in a diagrammatic, perspective view, and indicated by the reference number 40". The present description will be limited to aspects of connector insert 40" which differ from previously described insert 40 for purposes of brevity. It should be appreciated that connector insert 40" can be hermaphroditically configured such that an opposing connector insert in a connector pair is identical. In this embodiment, connector insert 40" includes a face or surface 88" that defines a groove 300 which surrounds a group of four dielectric inserts. A resilient member 304 such as, for example, a coil spring is received in groove 300 such that at least a portion of the coil spring extends outward beyond surface 88". The coil spring can be attached within groove 300, for example, by press-fit or electrically-conductive epoxy. Suitable materials for the coil spring include, but are not limited to stainless steel and beryllium copper. Dielectric inserts 94 can be flush or recessed with respect to surface 88" by a suitable amount such as, for example, 5 mils or within a range from 1 to 10 mils. In this way, grounding of connector insert 40' to an opposing or confronting connector insert, as part of a connector pair, is accomplished by coil spring 304 resiliently contacting a confronting portion 310, shown using a pair of dashed lines, of face 88" of the confronting connector insert. Confronting portion 310 can be ring-like and surrounds a corresponding row of contacts of the confronting connector insert. It should be appreciated that recess 300 and spring 304 can be configured in any suitable manner and/or shape depending upon the specific arrangement of dielectric inserts within surface 88" and are not limited to the specific configuration that has been shown. For example, spring 304 and the associated recess can be configured to surround just one dielectric insert, provided that the dielectric inserts are sufficiently spaced far apart, or one of the rows having three dielectric inserts, or to surround all of the dielectric inserts of one-half of the connector insert, while still maintaining a hermaphroditic configuration.

FIGS. 13 and 14 illustrate yet another embodiment of a connector insert according to the present disclosure and generally indicated by the reference number 40'''. FIG. 13 is a diagrammatic, partially exploded perspective view illustrating the face of the connector while FIG. 14 is a diagrammatic, partially exploded view, in perspective, taken from the rear of the insert and with inert adapter 34 rendered as invisible for purposes of illustrating additional details. The present description will generally be limited to aspects of connector insert 40''' which differ from previously described insert 40 for purposes of brevity. It should be appreciated that connector insert 40''' can be hermaphroditically configured such that an opposing connector insert in a connector pair is identical. As seen in FIG. 13, one dielectric insert 94' is shown in a spaced apart relationship from connector insert 40''' along with a spring probe pin 110. Dielectric insert 94' defines a through opening for receiving spring probe pin 110. Of course, the through opening can just as readily receive a contact pad 114 (see FIG. 6) such that dielectric inserts 94' can support any suitable combination of spring probe pins and contact pads in a manner that is consistent with the descriptions above. It should be appreciated that any suitable shape can be used for the shape of dielectric inserts 94' and is not limited to the cylindrical configuration that is illustrated. Further, there is no requirement to use the same shape for all of the dielectric inserts received in each ground layer/base 86', or for all of the dielectric inserts to support the same number of contacts. That is, some dielectric inserts can support differential pairs as discussed above, while others are single-ended, as shown in FIG. 13. In some embodiments, other types of traditional contacts, as are known in the art, can be used alongside the high-speed contacts of the present disclosure within a single connector shell. Dielectric inserts 94' can be formed from any suitable dielectric material such as, for example, Teflon, Ultem, EPDM or PEEK. In this regard, the particular dielectric material that is selected cooperates with the remainder of the structure of the dielectric insert and ground layer 86' to provide a characteristic transmission-line impedance that is matched to another characteristic transmission-line impedance that is provided by flexible printed circuit board assemblies **54*a*' and 54*b*', as yet to be described. In the present embodiment, a single-ended configuration is provided such that the characteristic impedance is presented between the spring probe pin (or contact pad) and ground layer 86'**. The characteristic impedance, for example, can be 50 or 75 ohms. Design considerations with respect to establishing a given characteristic impedance involve, for example, the outer diameter of the center pin, inner diameter of the ground layer opening, and the dielectric constant of the insert material.

Referring primarily to FIG. 14, attention is now directed to details with respect to flexible circuit board assembly 154'. The latter is shown in a partially exploded view, with one side of the assembly spaced apart from the overall assembly in order to illustrate details of its structure. In the present embodiment, the flexible circuit board assembly includes first and second flexible circuit boards 154' and 156', respectively, which can be identical to one another, although this is not required. Each of the first and second flexible circuit boards includes a connector contact portion 160' from which a pair of flex extensions 164' extend so as to be received within aperture 60 of connector insert adapter 34 (FIGS. 4 and 5.) In the present embodiment, each flexible circuit board is doubled-layered and includes electrically conductive traces 167' on a first side 168' and a ground plane 170' on a second, opposing side, as will be described in further detail. Other embodiments can utilize single-layered or multi-layered configurations. Flexible extensions 164' can be provided as layers within a multilayer configuration diverging or separating into each connector contact portion 160', as opposed to using separate flexible circuit boards 154' and 156'. Each connector portion 160' can at least generally form a 90° angle with its associated pair of flex extensions 164'.

FIG. 15 is a diagrammatic view, in perspective, shown here for purposes of describing additional details with respect to an embodiment of the construction of each half of flexible printed circuit board assembly 54' of FIGS. 13 and 14. It should be appreciated that the discussions with respect to FIG. 15 are equally applicable to circuit board assemblies using multilayer rigid and/or flexible printed circuit boards and combinations of rigid and flexible printed circuit boards. In the present embodiment, flexible circuit board assembly 154' is shown interfaced to the spring probe pins of two dielectric inserts 94'. A distal end 188' can be externally electrically interfaced in any suitable manner. The contact of each dielectric insert, whether a spring probe pin or a contact pad, is electrically interfaced to a high speed data path that is defined by the flexible circuit board. In the present embodiment, seven high speed data paths are shown, indicated by the reference numbers **200*a*'-*g*'. Each high speed data path includes a single electrical conductor or trace to define a single-ended configuration. Flexible circuit board 154' is configured to provide a transmission-line path such that the trace for each high speed data path exhibits a characteristic transmission-line impedance with respect to ground plane 170' (FIG. 14) that is matched to the impedance provided by dielectric insert 94' supporting the spring probe pin relative to the ground plane. The traces on the flexible circuit board can be electrically coupled to associated contacts, for example, using standard soldering techniques. Ground plane 170' can be electrically interfaced to its associated connector insert 40''' in any suitable manner such as, for example, by soldering. In other embodiments, ground features may also be present on the same side of the flexible circuit board as traces 167'. Such features can include, for example, ground traces. In the present example, each high speed path 200 is configured to exhibit an impedance of 50 ohms as the characteristic transmission-line impedance, although any suitable value may be utilized. The impedance of these high speed data paths can be established, for example, based on signal trace width, separation between signal trace and ground traces or planes, and the dielectric constant of the flexible circuit board material in a manner that is familiar to those of ordinary skill in the art. In the present embodiment, each flexible circuit board assembly 54' provides for fourteen parallel high frequency signal paths/interconnects capable of speeds exceeding 15 GHz for each differential 50 ohm single-ended transmission line. Accordingly, an overall throughput of at least 210 GHz total bandwidth can be provided by an overall connector pair. In this regard, suitable embodiments of flexible circuit board 54'** can be configured with less than or more than seven high speed data paths with associated numbers of dielectric inserts/contacts.

FIG. 16 is a diagrammatic, partially cut-away view, in perspective, showing a distal end of previously described flexible printed circuit board 154 electrically interfaced to a rigid printed circuit board 480 by an embodiment of an edge connector 500 that is produced in accordance with the present disclosure. Each of high speed data paths 200*a*-200*f* is electrically coupled to a corresponding high speed data path 504*a*-504*f*, which may be referred to collectively as data paths 504. The latter can be configured with a characteristic transmission line impedance that matches that of high speed data paths 200. It should be appreciated that the present embodiment of edge connector 500 can accommodate ten high speed data paths such that four of these paths serve as spares in the present example. Data paths 504 may be utilized to transfer data for any suitable purpose on rigid printed circuit board 480. By way of example, one or more of data paths 504 can be in communication with a data path 520 that is interfaced to one or more opto-electronic contacts 524 which can serve as an optical transmitter or receiver for external optical communication, for example, via a fiber optic cable. Power and other electrical connections, as needed, are understood to be present but have not been shown for purposes of illustrative clarity. The opto-electronic contact can include a flexible circuit board extension 525 that is removably receivable in a connector 526. The opto-electronic contact can be electrically interfaced to rigid printed circuit board 480 in any suitable manner. For example, extension 525 can be soldered to the rigid board. In an embodiment, optoelectronic contact 524 can be configured to be received, for example, in a size 8 cavity, of a receptacle that is configured according to ARINC 600 or in any other suitable manner. In this case, the ARINC 600 receptacle can support contact 524 along with other opto-electronic contacts housed in other cavities that are defined by the receptacle. An advanced opto-electronic contact, by way of non-limiting example, is described in detail in commonly owned U.S. Published Patent Application no. 2014/0029900, which is hereby incorporated by reference. The use of opto-electronic contacts is not required. That is, rigid printed circuit board 480 can just as readily support an opto-electronic converter module 529 that is interfaced to data path 520'. Module 529 can include a port for external optical communication. Module 529 can be any suitable type of opto-electronic transceiver component, including multi-channel WDM or parallel-optical devices, as are known in the art.

Attention is now directed to FIG. 17 in conjunction with FIG. 16 for purposes of describing additional details with regard to edge connector 500. FIG. 17 illustrates an embodiment of edge connector 500, in perspective, in a diagrammatic and partially cut-away exploded view. Edge connector 500 includes a board mount 530 that is configured to define a plurality of connector insert apertures 84, each of which can receive a dielectric insert 94. Board mount 530 can be formed from any suitable conductive material such as, for example, gold-plated aluminum. It should be appreciated that board mount 530 is analogous to ground base 86 of FIG. 6. In the present example, each dielectric insert receives a pair of spring probe pins 110 having contact pin 118 (see FIG. 8) oriented downward in the view of FIGS. 16 and 17. As discussed above, dielectric inserts, spring probe pins 110 and the surrounding structure can cooperate to exhibit a characteristic transmission line impedance that is matched to high speed data paths 200. Another group of spring probe pins, several of which are designated by the reference number 110', can also be installed in through holes that are defined by board mount 530 for grounding purposes, as will be further described, but are not required. Spring probe pins 110 and 110' can be installed in dielectric inserts 94 and board mount 530, respectively, in any suitable manner such as, for example, by using a pressed fit such that an upper end of each spring probe pin protrudes above the upper surface of board mount 530, in the view of FIG. 17. In this way, the upper end of each spring probe pin can be soldered to a contact ring 534, several of which are individually designated, that terminates each trace of high speed data paths 200. Guide pins 540 can be supported by rigid printed circuit board 480 to be received within cooperating through holes (not visible) that are defined by board mount 530 for purposes of aligning the spring probe pins with features on the rigid printed circuit board. In another embodiment, guide pins 540 can be supported by board mount 530. Ground contacts 548, only two of which are shown for purposes of illustrative clarity, can include vias that are electrically connected to a ground plane/layer or traces located on any layer of rigid printed circuit board 480. Each ground contact 548 is positioned for electrical contact with one of spring probe pins 110', as will be further described. Each trace of data paths 504 is terminated in a contact pad 550, several of which are individually designated. A ground plane and/or ground traces can be provided on the bottom side of flexible printed circuit board 54, in the view of FIG. 17 having relieved areas around the footprint for each dielectric insert 94, in the manner illustrated in FIG. 10. Fasteners 554 can pass through an aperture 556, defined by the board mount, to be received by threaded inserts 558 to capture board mount 530 between the distal end of flexible printed circuit board 154 and rigid printed circuit board 480, as will be further described in detail immediately hereinafter.

Referring to FIG. 17, assembly of edge connector 500 involves installing spring probe pins 110 and 110' in the board mount. Flexible printed circuit board 154 is installed on top of board mount 530 such that upper ends of spring probe pins align with contact rings 534. Further, the upper surface, in the view of the figure, of board mount 530 can be soldered to ground plane 170 (FIG. 10) on the back side of flexible printed circuit board 154. Contact rings 534 and upper ends of spring probe pins 110 can then be soldered. The upper ends of spring probe pins 110', provided for grounding purposes, can contact the ground plane on the back side of flexible printed circuit board 154 to carry ground continuity through and into board mount 530. The use of a plurality of spring probe pins 110' is not required but can assure ground continuity and mitigate concerns at least with respect to warping of rigid printed circuit board 480. It is noted that any suitable number of spring probe pins 110' can be used.

To attach edge connector 500 to the rigid circuit board, board mount 530 is received onto guide pins 540. Fasteners

554 are then installed and tightened such that spring probe pins 110 and 110' resiliently contact pads 550 and 548, respectively, on rigid printed circuit board 480.

FIG. 18 is a diagrammatic view, in perspective, illustrating an embodiment of an active optical cable (AOC), generally indicated by the reference number 600 and produced in accordance with the present disclosure. In the present embodiment, AOC 600 includes first and second, opposing D-Subminiature connectors 604 (only one of which is visible). Each connector 604 is supported by a backshell 608. A jacket 610 extends between backshells 608. As will be seen, jacket 610 can house a plurality of optical fibers. Electrical wires may also be included in jacket 610, for example, to provide for remote-powering of one end of the cable from the other end, as well as transmission of monitor and control signals.

Attention is now directed to FIG. 19 which is a diagrammatic view, in perspective, that illustrates one connector 604 and an associated backshell 608. A cover 620 is shown removed from backshell 608 in order to illustrate an embodiment of the internal structure within the backshell. In particular, four optical transceivers 624*a*-624*d* (which may be referred to generally or collectively as transceivers 624) are supported in electrical communication with a circuit board assembly 628. In the present embodiment, each optical transceiver is configured for 10 Gbps bidirectional data communication. Each optical transceiver can include an optical transmitter 640 and an optical receiver 642, as indicated for transceiver 624*a* and each of which is configured for 10 Gbps unidirectional data communication. An optical fiber 650 is shown in optical communication with optical transmitter 640 and is routed from the latter into jacket 610 for optical communication with an optical receiver supported by the backshell at the opposing end of the AOC. It should be appreciated that any suitable number of optical fibers can extend through jacket 610 between optical transmitter/receiver pairs, although only one fiber has been shown for purposes of illustrative clarity. In the present embodiment, eight optical fibers can be used to accommodate all four optical transceivers. Jacket 610 can also support electrical wires to connect both ends of the AOC together to provide remote-powering of either end of the cable as well as monitor and control functions or transport of low-speed signals. Jacketed cable 610 may also be connectorized to provide for a removable interface either along its length, to support penetrating of bulkheads in an aircraft installation, or at the housing 600 to permit field serviceability in the event of cable breakage. Such features can be provided in addition to the electrical disconnection point via connector 700, rather than a multi-way fiber optic disconnection point. Fiber optic connectors typically require inspection and cleaning on each mating cycle, whereas the electrical disconnect provided by the present disclosure does not. This is a particular advantage in harsh environmental applications that are encountered in industrial, aerospace, mining, oil/gas production or military applications. In this way, the benefits of very high-speed fiber optic transmission are achieved, without the disadvantages of multiple-contact fiber-optic connectors.

Still referring to FIG. 19, the optical receivers and transmitters of transceivers 624 are electrically interfaced to connector 604 by a plurality of high speed data paths that extend between the optical transceivers and connector 604. One of these high speed data paths is partially shown and indicated by the reference number 660 in association with optical transceiver 624*d*. It is to be understood that any suitable number of high speed data paths can be present. The high speed data paths can be configured in accordance with the descriptions above, for example, using differential pairs of conductors or using a single-ended configuration, each of which can include associated grounding features such a ground plane on a back side of the circuit board. In this regard, circuit board assembly 628 can be configured based on the teachings above in relation to flexible circuit board 154 of FIG. 9. In this regard, considerations discussed above in relation to maintain a characteristic transmission line impedance along the high speed electrical data paths remain equally applicable with respect to circuit board 628. Connector 604 can include an electrically conductive insert 630 that supports a plurality of dielectric inserts 94 each of which dielectric inserts, in the present embodiment, supports a pair of contact pads 114. It should be appreciated that electrically conductive insert 630 is analogous to ground base 86 of FIG. 6. As described above in relation to FIGS. 6, 7*a* and 7*b*, each dielectric insert can support a pair of contact pads, a pair of spring probe pins or a combination of one spring probe pin and one contact pad.

FIG. 20 is a diagrammatic illustration, in perspective, showing backshell 608 and an associated connector 604, at one end of AOC 600, in a confronting relationship for engaging a female D-Subminiature connector 700 that is mounted in a panel 704. Connector 700 can support insert 630 having dielectric inserts 94 including an arrangement of spring probe pins and contact pads that is complementary to the arrangement in connector 604. In the present embodiment, each dielectric insert 94 of connector 700 supports a pair of spring probe pins. Dielectric inserts 94 of connector insert 700 can be interfaced to a flexible printed circuit board 710 which is itself electrically interfaced to an instantiation of previously described edge connector 500 including board mount 530.

Attention is now directed to FIG. 21, which is a diagrammatic view, in perspective that illustrates a genderless or hermaphroditic connector pair in a spaced apart confronting relationship, generally indicated by the reference number 800. Connector pair 800 includes a first connector 804*a* and a second connector 804*b*. Hence, the connectors can be generically referred to hereinafter as connector(s) 804 since they are identically configured. Electrical connector 804 includes a shell 810 that receives a suitable connector insert. In one embodiment, each shell 810 can receive connector insert 40 of FIG. 6 or 40" of FIG. 12, each of which is hermaphroditically configured. In another embodiment, each shell 810 receives a connector insert 40'" which is likewise hermaphroditic and resembles aforedescribed connector insert 40. Hence, the present descriptions may be limited to the manner in which insert 40'" differs from insert 40. In particular, a pair of designated apertures 84 are empty for receiving a respective and complementary configured dowel 814 of the confronting connector insert 814 when the connector pair is mated. The dowel can be integrally formed as part of the connector insert or can comprise a dowel pin that is inserted into an appropriate one of the apertures defined by the connector insert. Each insert 40'" also supports a pair of springs 178 (see also, FIG. 6). When the connector pair is mated, each spring 178 contacts a corresponding/confronting spring. Each connector shell 810 includes a free end 820 that supports a thread 824 for threadingly receiving an internally threaded locking collar 830. The latter is rotatably movable between an engaged position, in which the locking collar of first connector 804*a* is shown, and a disengaged or retracted position, in which the locking collar of second connector 804*b* is shown. In the retracted position, locking collar 804 can engage a wave spring 834 which serves, for example, to retain the locking collar in the retracted position. The connector pair can be mated by initially positioning locking collar 830 of both connectors 804 in the retracted position. The confronting inserts 40''' are then engaged and, thereafter, either one of locking collars 804 can be rotated to engage threads 824 of the opposing connector such that a seal 840 engages a corresponding seal of the opposing locking collar. Each connector 804 can support a circuit board arrangement such as, for example, described with respect to FIG. 19 such that connector 804*a* can be optically and electrically coupled to a first cable 850*a* (partially shown) and connector 804*b* can be optically and electrically coupled to a second cable 850*b* (partially shown). Since each of these connectors can support an identical connector 804, a hermaphroditic and, therefore, genderless Active Optical Cable is formed so as to allow such AOCs to be matable with one another. In this regard and in any suitable combination, one set of dielectric inserts in a hermaphroditic AOC can be associated with optical transceivers, while the remaining inserts can carry electrical signals, power, monitor and control circuit lines. In this way, long cable runs can be constructed employing a concatenation of AOCs. In this scenario, electrical power can be provided in a "daisy-chain" fashion to provide power to multiple active optical cables in series, with the power originating from either end of the concatenated cable run. Applicants recognize that the disclosed hermaphroditic AOC provides for convenient rapid construction and deployment of such long cable runs in time critical situations such as, for example, those encountered in military applications.

In view of the foregoing, it should be clear that the teachings that have been brought to light herein are applicable to a wide range of connector styles and configurations, either currently available or yet to be developed, and that the examples given herein are not intended as limiting. As non-limiting examples, other suitable connector types include D38999, 5015, 28840, 24308 D-subminiature, 85513 micro-D, Glenair Mighty-Mouse, and the like.

The foregoing description of the invention has been presented for purposes of illustration and description. Accordingly, the present application is not intended to be exhaustive or to limit the invention to the precise form or forms disclosed, and other embodiments, modifications and variations may be possible in light of the above teachings wherein those of skill in the art will recognize certain modifications, permutations, additions and sub-combinations thereof.

What is claimed is:

1. A connector insert arrangement receivable in a connector housing for removable engagement with a complementary connector, said connector insert arrangement comprising:

a plurality of dielectric inserts each of which supports one or more electrical contacts for access by the complementary connector at a first insert surface of each dielectric insert and each of the dielectric inserts defines an opposing, second insert surface and each electrical contact is selected as one of a contact pad and a spring probe pin for electrical contact with a complementary spring probe pin and complementary contact pad, respectively, in the complementary connector;

a ground body including a ground base that is electrically conductive having a thickness extending between a first ground base surface and a second, opposing ground base surface such that said thickness defines a plurality of apertures each of which receives one of the dielectric inserts for placing each first insert surface in a confronting relationship with the complementary connector and a predetermined characteristic electrical transmission line impedance is exhibited for each electrical contact based on the configuration of each dielectric insert in relation to the ground base; and a circuit board arrangement having a first interface end and an external, opposing interface end with the first interface end electrically interfacing each electrical contact proximate to the second insert surface of each dielectric insert and including at least one ground path in electrical communication with the ground body and extending from the first end of the circuit board to the external interface end for grounding the ground body, and the circuit board forms a plurality of high speed data paths, associated with said electrical contacts, to maintain said characteristic transmission line impedance along each high speed data path and extending to the external interface end of the circuit board arrangement such that each high speed data path serves as an independent transmission line structure that provides a data transfer rate of at least 1 gigabit per second.

2. The connector insert arrangement of claim 1 wherein the circuit board arrangement includes a first side that supports the plurality of high speed data paths and the ground path includes a ground plane on a second, opposing side of the circuit board arrangement such that the ground plane substantially covers the second side.

3. The connector insert arrangement of claim 1 wherein the circuit board arrangement includes at least one flexible circuit board extending from the first interface end to the external interface end.

4. The connector insert arrangement of claim 1 wherein at least one dielectric insert permanently receives a pair of said contacts.

5. The connector insert arrangement of claim 4 wherein the electrical contacts for at least one dielectric insert include one spring probe pin and one contact pad.

6. The connector insert arrangement of claim 4 wherein said pair of electrical contacts is configured as a differential pair of contacts to exhibit the predetermined characteristic transmission line impedance therebetween.

7. The connector insert arrangement of claim 6 wherein said circuit board arrangement includes a pair of electrical conductors in electrical communication with said differential pair of contacts such that said pair of electrical conductors exhibits said predetermined characteristic transmission line impedance continuously extending from the first interface end to the external interface end.

8. The connector insert arrangement of claim 7 including at least one of said dielectric inserts supporting a differential pair of said contacts and an associated pair of conductors for each differential pair of contacts such that the connector insert arrangement provides for a data throughput rate of at least 1 gigabits per second per each differential pair of contacts.

9. The connector insert arrangement of claim 1 wherein at least one high speed data path comprises a single-ended connection having a single trace extending from the first interface end to the external interface end to define the characteristic transmission line impedance with respect to the ground path.

10. The connector insert arrangement of claim 1 wherein the electrical contacts for each dielectric insert are selected as one of spring probe pins and contact pads such that some of the dielectric inserts include spring probe pins and others of the dielectric inserts include contact pads for engaging the complementary connector.

11. The connector insert arrangement of claim 1 where the aforementioned ground body is a first ground body installed in the connector housing and defining a first axis and wherein said electrical contacts supported by said first ground body provide a predetermined mating tolerance for movement of the first ground body relative to a second ground body, which defines a second axis and is installed in the complementary connector, where the predetermined tolerance provides for said relative movement of the first ground body (i) toward and away from the second ground body, (ii) transverse to the second ground body, and (iii) rotated with respect to the second ground body such that the first axis is angularly offset with respect to the second axis.

12. The connector insert arrangement of claim 1 wherein a first region of the ground body includes dielectric inserts having electrical contacts that are limited to spring probe pins and a second region of the ground body includes electrical contacts that are limited to contact pads.

13. The connector insert arrangement of claim 12 configured to define an axial direction and wherein the first region and the second region are oppositely positioned on the ground body with respect to the axial direction.

14. The connector insert arrangement of claim 12 wherein the first region and the second region are at least approximately equal in area.

15. The connector insert arrangement of claim 12 wherein the number of spring probe pins in the first region is equal to the number of contact pads in the second region.

16. The connector insert arrangement of claim 1 wherein the circuit board arrangement includes a first flexible circuit board and a second flexible circuit board such that a first region of the ground body includes a first group of electrical contacts that are electrically interfaced to a first end extension of the first flexible circuit board and a second region of the ground body includes a second group of electrical contacts that are electrically interfaced to a second end extension of the second flexible circuit board.

17. The connector insert arrangement of claim 16 configured to define an axial direction such that the first and second regions as well as the first and second flexible extension ends of the first and second flexible circuit boards are symmetrically arranged with respect to the axial direction.

18. The connector insert arrangement of claim 16 wherein the first end extension and the second end extension are each at least generally planar when electrically interfaced to the first group and the second group of electrical contacts, respectively.

19. The connector insert arrangement of claim 1 wherein the circuit board arrangement includes a multilayer flexible circuit board having a first end extension such that a first region of the ground body includes a first group of electrical contacts that is electrically interfaced to the first end extension of the multilayer flexible circuit board and a second region of the ground body includes a second group of electrical contacts that is electrically interfaced to a second end extension of the multilayer flexible circuit board, and the first end extension and the second end extension merge into a multilayer transmission line portion that extends to the external interface end of the circuit board arrangement.

20. The connector insert arrangement of claim 1 wherein the circuit board arrangement includes a first flexible circuit board and a second flexible circuit board such that a first region of the ground body includes a first group of electrical contacts that is electrically interfaced to a first interface portion of the first flexible circuit board and a second region of the ground body includes a second group of electrical contacts that is electrically interfaced to a second interface portion of the second flexible circuit board, and the first flexible circuit board includes a first transmission line portion extending from the first interface portion to a first external connection end forming one part of said external interface end and the second flexible circuit board includes a second transmission line portion extending from the second interface portion to a second external connection end forming another part of said external interface end.

21. The connector insert arrangement of claim 1 wherein at least one portion of the circuit board assembly includes a rigid printed circuit board.

22. The connector insert arrangement of claim 1 wherein the circuit board arrangement includes a first rigid circuit board such that a first region of the ground body includes a first group of electrical contacts that are electrically interfaced to the first rigid circuit board and a second region of the ground body includes a second group of electrical contacts that are electrically interfaced to a second end extension of a second rigid circuit board.

23. The connector insert arrangement of claim 22 wherein the first rigid circuit board and the second rigid circuit board are electrically interfaced to a multilayer rigid printed circuit board that extends to and forms the external end of the circuit board arrangement.

24. The connector insert arrangement of claim 1 further comprising:

a ground spring fixedly attached to the first ground base surface for resiliently engaging a complementary first ground base surface of the complementary connector when engaged therewith to carry a signal ground through the engaged connector insert and the complementary connector.

25. The connector insert arrangement of claim 24 wherein said first ground base surface presents a ground pad area for resilient engagement with a complementary ground spring of the complementary connector.

26. The connector insert arrangement of claim 25 defining an axial direction such that the ground spring and the ground pad area are oppositely positioned with respect to the axial direction.

27. The connector insert of claim 1 further comprising:

an insert body for supporting said ground body and including a peripheral outline that is receivable in said connector housing.

28. The connector insert of claim 27 wherein the connector housing is a ruggedized housing.

29. The connector insert of claim 27 wherein the ground body is held at a signal ground potential and the insert body is formed from an electrically insulative material to electrically isolate the signal ground potential from another ground potential at which the connector housing is held.

30. The connector insert arrangement of claim 29 wherein the insert body is formed from a liquid crystal polymer.

31. The connector insert arrangement of claim 1 configured as hermaphroditic with respect to the complementary connector.

32. The connector insert arrangement of claim 1 defining an axial direction and further comprising a guide pin that projects in said axial direction and a guide bore such that the guide pin is positioned opposite said axial direction from the guide bore and the guide pin is receivable within a complementary guide bore of the complementary connector while the guide bore receives a complementary guide pin of the complementary connector.

33. The connector insert arrangement of claim 1 wherein at least one high speed data path is terminated by an opto-electronic converter at the external connection end of the circuit board arrangement.

34. An active optical connector, comprising:

the connector insert arrangement of claim 1 supported in said connector housing;

a connector backshell attached to said connector housing; and a plurality of opto-electronic converters received in the connector backshell such that each opto-electronic converter is electrically interfaced to one of the high speed data paths at the external interface end of the circuit board arrangement and optically interfaceable with a fiber optic cable.

35. An active optical cable, comprising:

at least one fiber optic cable having opposing first and second ends;

first and second housings each receiving a respective one of the first and second ends of the fiber optic cable;

at least one opto-electronic converter received in each one of the first and second housing in optical communication with a respective one of the first and second ends of the fiber optic cable; and the connector insert arrangement of claim 1 supported in each one of the first and second housings in electrical communication with a respective one of the opto-electronic converters.

36. The active optical cable of claim 35 wherein the first and second housings are hermaphroditic such that either one of the first and second housings is connectable with either one of the first and second housings of a different active optical cable to form a concatenation of active optical cables.

37. A method for producing a connector insert arrangement that is receivable in a connector housing for removable engagement with a complementary connector, said method comprising:

configuring a plurality of dielectric inserts such that each dielectric insert supports one or more electrical contacts for access by the complementary connector at a first insert surface of each dielectric insert and each of the dielectric inserts defines an opposing, second insert surface, and each electrical contact is selected as one of a contact pad and a spring probe pin for electrical contact with a complementary spring probe pin and complementary contact pad, respectively, in the complementary connector;

forming a ground base that is electrically conductive to include a thickness extending between a first ground base surface and a second ground base surface such that said thickness defines a plurality of apertures each of which receives one of the dielectric inserts for placing the first insert surface in a confronting relationship with the complementary connector and a predetermined characteristic electrical transmission line impedance is exhibited for each electrical contact based on the configuration of each dielectric insert in relation to the ground base;

configuring a circuit board arrangement having a first interface end and an external, opposing interface end with the first interface end electrically interfacing each electrical contact proximate to the second insert surface of each dielectric insert and including at least one ground path in electrical communication with the ground body and extending from the first end of the circuit board to the external interface end for grounding the ground body such that the circuit board forms a plurality of high speed data paths, associated with said electrical contacts, to maintain said characteristic transmission line impedance along the high speed data path and extending to the external interface end of the circuit board arrangement so that each high speed data path serves as an independent transmission line structure that provides a data transfer rate of at least 1 gigabit per second.

* * * * *